United States Patent
Motohashi et al.

(10) Patent No.: US 7,974,520 B2
(45) Date of Patent: Jul. 5, 2011

(54) INFORMATION RECORDING ENSURING COMPATIBILITY WITH DIFFERENT TYPES OF RECORDING MEDIA

(75) Inventors: Tsutomu Motohashi, Tokyo (JP); Takanobu Matsuba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 2167 days.

(21) Appl. No.: 10/411,113

(22) Filed: Apr. 11, 2003

(65) Prior Publication Data

US 2003/0202782 A1    Oct. 30, 2003

(30) Foreign Application Priority Data

Apr. 26, 2002  (JP) .................................. 2002-125337
Apr. 30, 2002  (JP) .................................. 2002-128720

(51) Int. Cl.
*H04N 5/76* (2006.01)
(52) U.S. Cl. ....................................... 386/295; 386/323
(58) Field of Classification Search .................. None
See application file for complete search history.

(56) References Cited

U.S. PATENT DOCUMENTS

| | | | |
|---|---|---|---|
| 5,572,502 A | 11/1996 | Naruse et al. | |
| 5,715,355 A | 2/1998 | Yonemitsu et al. | |
| 5,875,163 A * | 2/1999 | Kuroda et al. | 369/47.48 |
| 6,424,385 B1 * | 7/2002 | Koyama et al. | 348/734 |
| 6,553,532 B1 * | 4/2003 | Aoki | 714/763 |
| 6,609,175 B1 * | 8/2003 | Ando et al. | 711/112 |
| 6,724,703 B2 * | 4/2004 | Nakahara et al. | 369/47.23 |
| 2002/0046319 A1 | 4/2002 | Motohashi | |
| 2003/0058352 A1 | 3/2003 | Nishijima et al. | |
| 2003/0095484 A1 | 5/2003 | Motohashi | |

FOREIGN PATENT DOCUMENTS

| | | |
|---|---|---|
| JP | 7-235058 | 9/1995 |
| JP | H 07-311949 | 11/1995 |
| JP | H 08-171723 | 7/1996 |
| JP | 2001-291332 | 10/2001 |
| JP | 2003-101926 | 4/2003 |

\* cited by examiner

Primary Examiner — Jamie Atala
(74) Attorney, Agent, or Firm — Dickstein Shapiro LLP

(57) ABSTRACT

A method of optically recording data on a disk-like information recording medium from the center side to the peripheral side thereof, dividing the information recording medium into a plurality of recording divisions, includes the steps of: (a) recording the data in an initial recording division; (b) recording terminal end information successively after the step (a), the terminal end information indicating the end of the initial recording division; (c) determining whether the terminal end information recorded on the information recording medium reaches a specified region beyond a predetermined range from the center of the information recording medium; and (d) extending and recording the terminal end information in the step (b) so that the terminal end information reaches the specified region if the step (c) determines that the terminal end information does not reach the specified region.

55 Claims, 13 Drawing Sheets

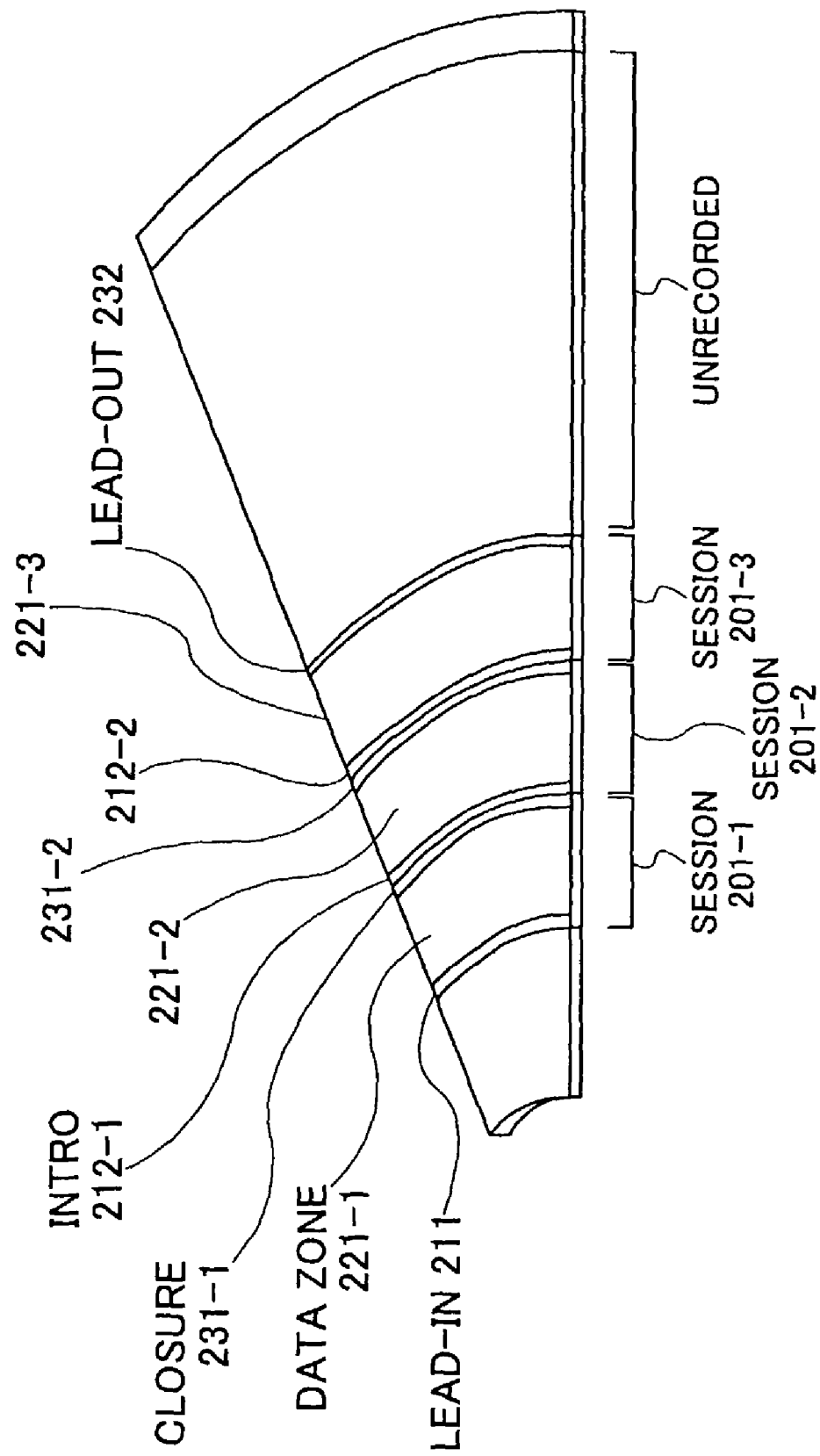

FIG.4

| Session | Zone | Description | Number of Physical Sectors |
|---|---|---|---|
| | Inner Drive Area | ......... | ......... |
| | Lead-in | ......... | ......... |
| SESSION 1 | Data | Data Zone | 16 (min) |
| | Closure | Buffer Zone C | 768 |
| | | Outer Session Identification Zone | 256 |
| | Intro | Buffer Zone A | 64 |
| | | Inner Session Identification Zone | 256 |
| SESSION 2 | | Session Control Data Zone | 640 |
| | | Buffer Zone B | 64 |
| | Data | Data Zone | 16 (min) |
| | Closure | Same As Session 1 | ......... |
| | ......... | ......... | ......... |
| | Intro | Same As Session 2 | ......... |
| SESSION N (N≦191) | Data | Data Zone | 16 (min) |
| | Lead-out | ......... | ......... |
| | Outer Drive Area | ......... | ......... |

FIG.5

| | Zone | Description | Physical Sector Number | Number of Physical Sectors |
|---|---|---|---|---|
| 241 | Inner Drive Area | Initial Zone | 16(min) | blanc |
| | | Inner Disc Test Zone | 23030H | 16384 |
| | | Count Zone Run-in | 27080H | 1024 |
| | | Inner Disc Count Zone | 27480H | 4096 |
| 242 | | Inner Disc Administration Zone | 28480H | 4096 |
| | | Table of Contents Zone | 29480H | 4096 |
| 211 / 1001-3 | Lead-in | Guard Zone 1 | 2DC80H | 512 |
| | | Reserved Zone 1 | 2DE80H | 4096 |
| | | Reserved Zone 2 | 2EE80H | 64 |
| | | Inner Disc Identification Zone | 2EEC0H | 256 |
| | | Reserved Zone 3 | 2EFC0H | 64 |
| | | Reference Code Zone | 2F000H | 32 |
| 1001-3 | | Buffer Zone 1 | 2F020H | 480 |
| | | Control Data Zone | 2F200H | 3072 |
| | | Buffer Zone 2 | 2FE00H | 512 |
| 221 | Data | Data Zone | 30000H | 2295104(max) |
| 232 | Lead-out | Buffer Zone 3 | 260540H(max) | 768 |
| | | Outer Disc Identification Zone | 260840H(max) | 256 |
| | | Guard Zone 2 | 260940H(max) | 4096(max) |
| | Outer Drive Area | Outer Disc Administration Zone | 261940H | 4096 |
| 251 | | Outer Disc Count Zone | 262940H | 4096 |
| | | Outer Disc Test Zone | 263940H | 16384 |
| | | Guard Zone 3 | 267940H | blanc |

| Main Data byte position | Description | Number of bytes |
|---|---|---|
| D0 to D3 | Content Descriptor | 4 |
| D4 to D7 | RESERVED | 4 |
| D8 to D39 | Drive ID | 32 |
| D40 to D63 | RESERVED | 24 |
| D64 to D79 | TOC Item 0 | 16 |
| D80 to D95 | TOC Item 1 | 16 |
| ⋮ | ⋮ | ⋮ |

| Main Data byte position | Description | Number of bytes |
|---|---|---|
| B0 to B2 | TOC Item Discriptor | 3 |
| B3 | Session Status | 1 |
| B4 | Session Number | 1 |
| B5 to B7 | Session Start Address | 3 |
| B8 to B10 | Session End Address | 3 |
| B11 to B15 | RESERVED | 5 |

| PHYSICAL SECTOR NUMBER | RADIUS (mm) |
|---|---|
| 6F000 | 29.82521 |
| 70000 | 29.90853 |
| 71000 | 29.99161 |
| 72000 | 30.07447 |
| 73000 | 30.1571 |
| 74000 | 30.2395 |
| 75000 | 30.32168 |
| 76000 | 30.40364 |
| 77000 | 30.48538 |
| 78000 | 30.56689 |
| 79000 | 30.6482 |
| 7A000 | 30.72928 |
| 7B000 | 30.81016 |

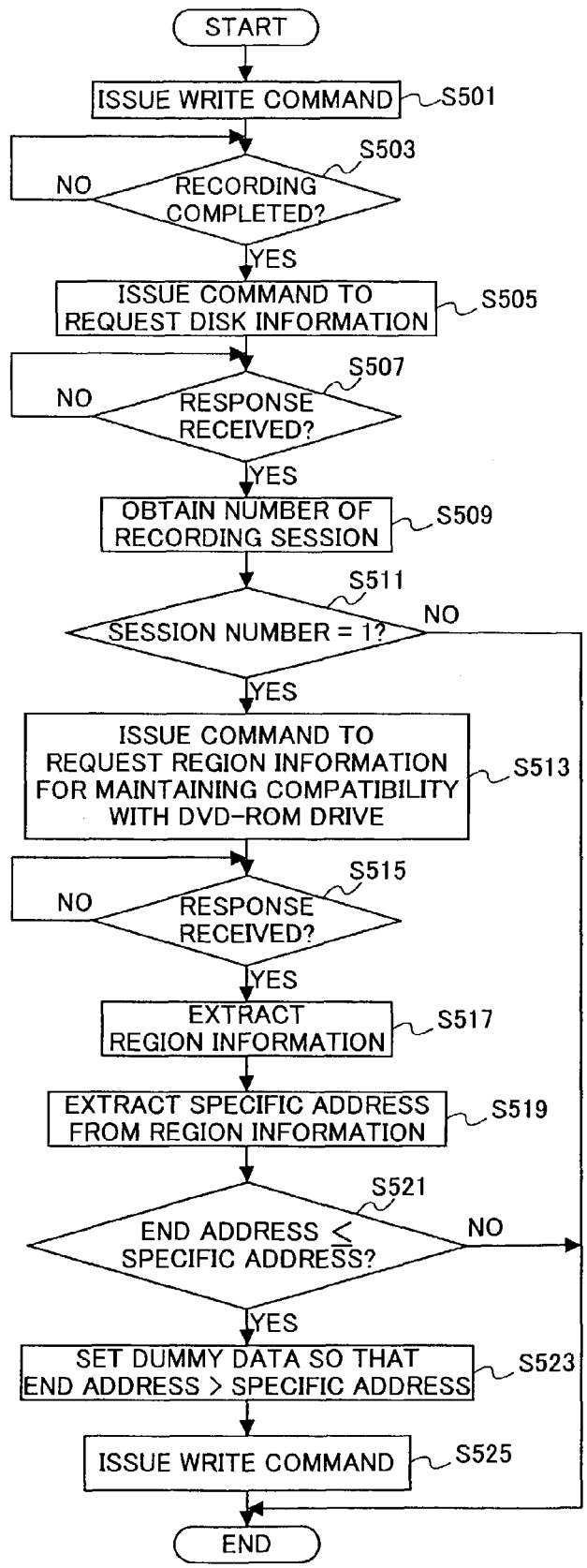

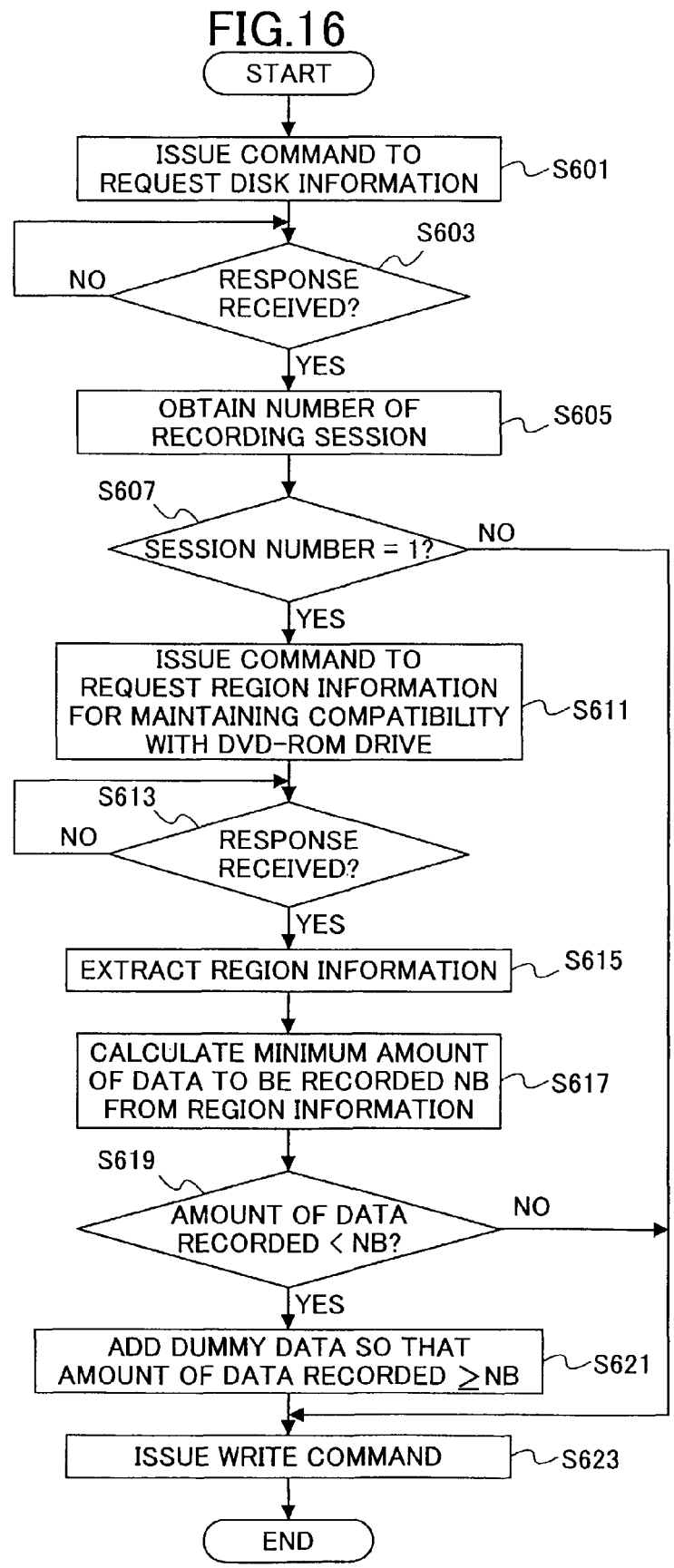

INFORMATION RECORDING ENSURING COMPATIBILITY WITH DIFFERENT TYPES OF RECORDING MEDIA

BACKGROUND OF THE INVENTION

1. Field of the Invention

The present invention generally relates to information recording, and more particularly to information recording on recording media on which recording is performable.

2. Description of the Related Art

Recently, personal computers have been enabled to process AV (audio-visual) information such as music and images with the improvement of their performance. Since the AV information is very large in amount, DVD (digital versatile disk)-type optical disks have attracted attention. As the DVD-type optical disks have become less expensive, optical disk units as information recording apparatuses have been widely used as one type of a peripheral device for personal computers. The DVD-type optical disks include DVD-ROM, DVD-RAM, DVD-R (DVD-recordable), DVD-RW (DVD-rewritable), DVD+R (DVD+recordable), and DVD+RW (DVD+rewritable) disks, on which data is recorded based on their respective predetermined standards. The DVD+R and DVD+RW disks, for instance, which are similar to the DVD-ROM disks in physical properties, have excellent compatibility with a DVD-ROM drive.

For a DVD+R, it is possible to employ a recording method called "multi-session layout" by which the DVD+R is divided into a plurality of recording divisions (sessions) to be recorded with information. In the case of employing the multi-session layout for a DVD+R, the first session is opened after an inner drive area including a TOC (table of contents) zone, and is followed by a plurality of sessions. After the last session, an outer drive area is generated. Each session is composed of an intro (a lead-in in the case of the first session), data, and a closure (a lead-out in the case of the last session). Data is recorded on a DVD+R in recording units called "fragments." The session is a region composed of at least one fragment to which predetermined information (a lead-in and a lead-out, for instance) is written. In recordable disks such as DVD+Rs, normally, data is sequentially recorded from the center to the periphery of the disk.

SUMMARY OF THE INVENTION

The DVD-ROMs are the first commercially-available disks among the DVD-type disks. Therefore, DVD-ROM drive units for reproducing data from the DVD-ROMs are widely used. Accordingly, compatibility with the DVD-ROM drive units is important for the DVD-type disks other than the DVD-ROMs so that the other DVD-type disks are playable on the DVD-ROM drive units.

In order to maintain compatibility with the DVD-ROM drive units, it is provided with respect to the DVD+Rs, for instance, that when recording in a session is completed, the session should be closed by writing a closure indicating the end of the session on the peripheral side of the session. It is further provided that when recording in a disk is completed, the disk should be closed by writing a lead-out indicating the end of the recording region of the disk in which region data is recorded.

Generally, in the DVD-ROMs, data is recorded in the recording region up to a position corresponding to a predetermined radial distance (for instance, approximately 30 mm) from the rotational center of a disk. Hereinafter, this position is also referred to as a "specific position." A variety of management information is recorded in proximity to the specific position. Therefore, if data is not recorded up to the specific position, the data is not read out normally by DVD-ROM drive units.

On the other hand, in the DVD+Rs, a session can be closed if the session includes at least one fragment (16 sectors). Therefore, it is possible that data is not recorded up to the specific position even if a session is normally closed in the disk or the disk itself is normally closed. For instance, if a small amount of data is recorded and then the first session is closed on a DVD+R disk in a DVD+R drive unit, the DVD+R disk may be generated with no information recorded at the specific position. Since the DVD+Rs have address information called ADIP (address in pre-groove) recorded in their grooves, a DVD+R drive unit can obtain the address information from the DVD+R disks even if the drive unit accesses a region with no recorded data. Therefore, the DVD+R drive units have no problem in accessing such DVD+R disks having no information recorded at the specific position. In the DVD-ROM drive units, however, information may not be reproduced normally from such DVD+R disks.

Accordingly, it is a general object of the present invention to realize information recording that eliminates the above-described disadvantage.

A more specific object of the present invention is to provide a recording method that can ensure compatibility with different types of recording media.

Another more specific object of the present invention is to provide a program used in an information recording system which program can ensure compatibility with different types of recording media and a recording medium recording such a program.

Another more specific object of the present invention is to provide an information processing apparatus and an information recording apparatus that can ensure compatibility with different types of recording media.

Yet another more specific object of the present invention is to provide an information recording system that can ensure compatibility with different types of recording media.

The above objects of the present invention are achieved by a method of optically recording data on a disk-like information recording medium from a center side to a peripheral side thereof, dividing the information recording medium into a plurality of recording divisions, the method including the steps of: (a) recording the data in an initial one of the recording divisions; (b) recording terminal end information successively after the step (a), the terminal end information indicating an end of the initial one of the recording divisions; (c) determining whether the terminal end information recorded on the information recording medium reaches a specified region beyond a predetermined range from a center of the information recording medium; and (d) extending and recording the terminal end information in the step (b) so that the terminal end information reaches the specified region if the step (c) determines that the terminal end information does not reach the specified region.

According to the above-described method, data is recorded up to the specified region beyond the predetermined range from the center of the information recording medium. Therefore, the data can be normally reproduced from the information recording medium even in a reproduction apparatus that cannot perform a normal reading operation unless data is recorded up to the specified region beyond the predetermined range from the center of a disk.

The above objects of the present invention are also achieved by an apparatus for optically recording data on a disk-like information recording medium from a center side to a peripheral side thereof, dividing the information recording medium into a plurality of recording divisions, the apparatus including: a first part recording the data in an initial one of the recording divisions; a second part recording terminal end information successively after recording the data, the terminal end information indicating an end of the initial one of the recording divisions; a third part determining whether the terminal end information recorded on the information recording medium reaches a specified region beyond a predetermined range from a center of the information recording medium; and a fourth part that, in recording the terminal end information, extends the terminal end information so that the terminal end information reaches the specified region if the third part determines that the terminal end information does not reach the specified region.

According to the above-described apparatus, data is recorded up to the specified region beyond the predetermined range from the center of the information recording medium. Therefore, the data can be normally reproduced from the information recording medium even in a reproduction apparatus that cannot perform a normal reading operation unless data is recorded up to the specified region beyond the predetermined range from the center of a disk.

The above objects of the present invention are also achieved by an information processing apparatus controlling an information recording apparatus for optically recording data on a disk-like information recording medium from a center side to a peripheral side thereof, dividing the information recording medium into a plurality of recording divisions, the information processing apparatus including: a first part causing the information recording apparatus to record the data in an initial one of the recording divisions; a second part causing the information recording apparatus to record terminal end information successively after recording the data, the terminal end information indicating an end of the initial one of the recording divisions; a third part determining whether the terminal end information recorded on the information recording medium reaches a specified region beyond a predetermined range from a center of the information recording medium; and a fourth part that, if the third part determines that the terminal end information does not reach the specified region, causes the information recording apparatus to extend and record the terminal end information so that the terminal end information reaches the specified region.

The above objects of the present invention are also achieved by an information processing apparatus controlling an information recording apparatus for optically recording data on a disk-like information recording medium from a center side to a peripheral side thereof, dividing the information recording medium into a plurality of recording divisions, the information processing apparatus including: a first part causing the information recording apparatus to record the data in an initial one of the recording divisions; a second part causing the information recording apparatus to record terminal end information successively after recording the data, the terminal end information indicating an end of the initial one of the recording divisions; a third part causing the information recording apparatus to determine whether the terminal end information recorded on the information recording medium reaches a specified region beyond a predetermined range from a center of the information recording medium; and a fourth part that, if the information recording apparatus determines that the terminal end information does not reach the specified region, causes the information recording apparatus to extend and record the terminal end information so that the terminal end information reaches the specified region.

According to the above-described information processing apparatuses, data is recorded up to the specified region beyond the predetermined range from the center of the information recording medium. Therefore, the data can be normally reproduced from the information recording medium even in a reproduction apparatus that cannot perform a normal reading operation unless data is recorded up to the specified region beyond the predetermined range from the center of a disk.

The above objects of the present invention are also achieved by an information recording system including: an information recording part optically recording data on a disk-like information recording medium from a center side to a peripheral side thereof, dividing the information recording medium into a plurality of recording divisions; an information processing part issuing an information recording command to the information recording part; and a part causing a function of recording data in an initial one of the recording divisions in the information recording part, a function of recording terminal end information successively after recording the data in the information recording part, the terminal end information indicating an end of the initial one of the recording divisions, a function of determining whether the terminal end information recorded on the information recording medium reaches a specified region beyond a predetermined range from a center of the information recording medium, and a function of extending and recording the terminal end information in the information recording part so that the terminal end information reaches the specified region if it is determined that the terminal end information does not reach the specified region to be centralized on and executed by one of the information recording part and the information processing part or to be distributed between and executed by the information recording part and the information processing part.

According to the above-described information recording system, data is recorded up to the specified region beyond the predetermined range from the center of the information recording medium. Therefore, the data can be normally reproduced from the information recording medium even in a reproduction apparatus that cannot perform a normal reading operation unless data is recorded up to the specified region beyond the predetermined range from the center of a disk.

The above objects of the present invention are also achieved by a machine-readable computer program for causing a computer to execute a method of optically recording data on a disk-like information recording medium from a center side to a peripheral side thereof, dividing the information recording medium into a plurality of recording divisions, the method including the steps of: (a) recording the data in an initial one of the recording divisions; (b) recording terminal end information successively after the step (a), the terminal end information indicating an end of the initial one of the recording divisions; (c) determining whether the terminal end information recorded on the information recording medium reaches a specified region beyond a predetermined range from a center of the information recording medium; and (d) extending and recording the terminal end information in the step (b) so that the terminal end information reaches the specified region if the step (c) determines that the terminal end information does not reach the specified region.

The above objects of the present invention are also achieved by a computer-readable recording medium storing a machine-readable computer program for causing a computer to execute a method of optically recording data on a disk-like information recording medium from a center side to a peripheral side thereof, dividing the information recording medium into a plurality of recording divisions, the method including the steps of: (a) recording the data in an initial one of the recording divisions; (b) recording terminal end information successively after the step (a), the terminal end information indicating an end of the initial one of the recording divisions; (c) determining whether the terminal end information recorded on the information recording medium reaches a specified region beyond a predetermined range from a center of the information recording medium; and (d) extending and recording the terminal end information in the step (b) so that the terminal end information reaches the specified region if the step (c) determines that the terminal end information does not reach the specified region.

The above objects of the present invention are also achieved by a machine-readable computer program to be installed in a computer provided to an information processing apparatus controlling an information recording apparatus for optically recording data on a disk-like information recording medium from a center side to a peripheral side thereof, dividing the information recording medium into a plurality of recording divisions, the machine-readable computer program causing the computer to execute an information recording method, the information recording method including the steps of: (a) causing the information recording apparatus to record the data in an initial one of the recording divisions; (b) causing the information recording apparatus to record terminal end information successively after the step (a), the terminal end information indicating an end of the initial one of the recording divisions; (c) determining whether the terminal end information recorded on the information recording medium reaches a specified region beyond a predetermined range from a center of the information recording medium; and (d) causing the information recording apparatus to extend and record the terminal end information so that the terminal end information reaches the specified region if the step (c) determines that the terminal end information does not reach the specified region.

The above objects of the present invention are also achieved by a computer-readable recording medium storing a machine-readable computer program to be installed in a computer provided to an information processing apparatus controlling an information recording apparatus for optically recording data on a disk-like information recording medium from a center side to a peripheral side thereof, dividing the information recording medium into a plurality of recording divisions, the machine-readable computer program causing the computer to execute an information recording method, the information recording method including the steps of: (a) causing the information recording apparatus to record the data in an initial one of the recording divisions; (b) causing the information recording apparatus to record terminal end information successively after the step (a), the terminal end information indicating an end of the initial one of the recording divisions; (c) determining whether the terminal end information recorded on the information recording medium reaches a specified region beyond a predetermined range from a center of the information recording medium; and (d) causing the information recording apparatus to extend and record the terminal end information so that the terminal end information reaches the specified region if the step (c) determines that the terminal end information does not reach the specified region.

The above objects of the present invention are also achieved by a machine-readable computer program to be installed in a computer provided to an information processing apparatus controlling an information recording apparatus for optically recording data on a disk-like information recording medium from a center side to a peripheral side thereof, dividing the information recording medium into a plurality of recording divisions, the machine-readable computer program causing the computer to execute an information recording method, the information recording method including the steps of: (a) causing the information recording apparatus to record the data in an initial one of the recording divisions; (b) causing the information recording apparatus to record terminal end information successively after the step (a), the terminal end information indicating an end of the initial one of the recording divisions; (c) causing the information recording apparatus to determine whether the terminal end information recorded on the information recording medium reaches a specified region beyond a predetermined range from a center of the information recording medium; and (d) causing the information recording apparatus to extend and record the terminal end information so that the terminal end information reaches the specified region if the step (c) determines that the terminal end information does not reach the specified region.

The above objects of the present invention are also achieved by a computer-readable recording medium storing a machine-readable computer program to be installed in a computer provided to an information processing apparatus controlling an information recording apparatus for optically recording data on a disk-like information recording medium from a center side to a peripheral side thereof, dividing the information recording medium into a plurality of recording divisions, the machine-readable computer program causing the computer to execute an information recording method, the information recording method including the steps of: (a) causing the information recording apparatus to record the data in an initial one of the recording divisions; (b) causing the information recording apparatus to record terminal end information successively after the step (a), the terminal end information indicating an end of the initial one of the recording divisions; (c) causing the information recording apparatus to determine whether the terminal end information recorded on the information recording medium reaches a specified region beyond a predetermined range from a center of the information recording medium; and (d) causing the information recording apparatus to extend and record the terminal end information so that the terminal end information reaches the specified region if the step (c) determines that the terminal end information does not reach the specified region.

The above objects of the present invention are also achieved by a machine-readable computer program to be installed in one of a computer provided to an information recording apparatus for optically recording data on a disk-like information recording medium from a center side to a peripheral side thereof, dividing the information recording medium into a plurality of recording divisions, and a computer provided to an information processing apparatus issuing an information recording command to the information recording apparatus, the machine-readable computer program causing the one of the computers to execute an information recording method, the information recording method including the steps of: (a) recording data in an initial one of the recording divisions in the information recording apparatus; (b) recording terminal end information successively after recording the data in the information recording apparatus, the terminal end information indicating an end of the initial one of the recording divisions; (c) determining whether the terminal end information recorded on the information recording medium reaches a specified region beyond a predetermined range from a center of the information recording medium; and (d) extending and recording the terminal end information in the information recording apparatus so that the terminal end information reaches the specified region if the step (c) determines that the terminal end information does not reach the specified region.

The above objects of the present invention are also achieved by a computer-readable recording medium storing a machine-readable computer program to be installed in one of a computer provided to an information recording apparatus for optically recording data on a disk-like information recording medium from a center side to a peripheral side thereof, dividing the information recording medium into a plurality of recording divisions, and a computer provided to an information processing apparatus issuing an information recording command to the information recording apparatus, the machine-readable computer program causing the one of the computers to execute an information recording method, the information recording method including the steps of: (a) recording data in an initial one of the recording divisions in the information recording apparatus; (b) recording terminal end information successively after recording the data in the information recording apparatus, the terminal end information indicating an end of the initial one of the recording divisions; (c) determining whether the terminal end information recorded on the information recording medium reaches a specified region beyond a predetermined range from a center of the information recording medium; and (d) extending and recording the terminal end information in the information recording apparatus so that the terminal end information reaches the specified region if the step (c) determines that the terminal end information does not reach the specified region.

The above objects of the present invention are also achieved by a machine-readable computer program to be installed in a computer provided to an information recording apparatus for optically recording data on a disk-like information recording medium from a center side to a peripheral side thereof, dividing the information recording medium into a plurality of recording divisions, and a computer provided to an information processing apparatus issuing an information recording command to the information recording apparatus, the machine-readable computer program causing the computers to execute an information recording method, the information recording method including the steps of: (a) recording data in an initial one of the recording divisions in the information recording apparatus; (b) recording terminal end information successively after recording the data in the information recording apparatus, the terminal end information indicating an end of the initial one of the recording divisions; (c) determining whether the terminal end information recorded on the information recording medium reaches a specified region beyond a predetermined range from a center of the information recording medium; and (d) extending and recording the terminal end information in the information recording apparatus so that the terminal end information reaches the specified region if the step (c) determines that the terminal end information does not reach the specified region, wherein the steps (a) through (d) are executed partly by the computer provided to the information recording apparatus and partly by the computer provided to the information processing apparatus.

The above objects of the present invention are also achieved by a computer-readable recording medium storing a machine-readable computer program to be installed in a computer provided to an information recording apparatus for optically recording data on a disk-like information recording medium from a center side to a peripheral side thereof, dividing the information recording medium into a plurality of recording divisions, and a computer provided to an information processing apparatus issuing an information recording command to the information recording apparatus, the machine-readable computer program causing the computers to execute an information recording method, the information recording method including the steps of: (a) recording data in an initial one of the recording divisions in the information recording apparatus; (b) recording terminal end information successively after recording the data in the information recording apparatus, the terminal end information indicating an end of the initial one of the recording divisions; (c) determining whether the terminal end information recorded on the information recording medium reaches a specified region beyond a predetermined range from a center of the information recording medium; and (d) extending and recording the terminal end information in the information recording apparatus so that the terminal end information reaches the specified region if the step (c) determines that the terminal end information does not reach the specified region, wherein the steps (a) through (d) are executed partly by the computer provided to the information recording apparatus and partly by the computer provided to the information processing apparatus.

According to the above-described programs, data is recorded up to the specified region beyond the predetermined range from the center of the information recording medium. Therefore, the data can be normally reproduced from the information recording medium even in a reproduction apparatus that cannot perform a normal reading operation unless data is recorded up to the specified region beyond the predetermined range from the center of a disk.

The above objects of the present invention are also achieved by a method of recording information on a recording medium on which recording is performable, the recording medium including a spirally or concentrically formed recording region, the method including the steps of: (a) determining, in recording user data, whether an end position of a region in which the user data is recorded in the recording region is in a specific region formed on a recording starting position side of a predetermined position; and (b) forming the user data into new user data by adding dummy data to the user data so that the end position is excluded from the specific region if the step (a) determines that the end position is in the specific region.

According to the above-described method, in recording user data, the step (a) checks the relationship between the end position of the region in which the user data is recorded in the recording region and a predetermined position, and determines whether the end position exists in a specific region. If the end position exists in the specific region, the step (b) forms new user data by adding dummy data to the user data so that the end position is excluded from the specific region. Thereby, if the conditions for ensuring compatibility with (a device for) an information recording medium or an information recording standard of another type include a condition relating to the amount of data recorded, for instance, it is possible to prevent the compatibility from being lost even if the amount of data is insufficient. That is, it is possible to ensure compatibility with (a device for) an information recording medium or an information recording standard of another type.

The above objects of the present invention are also achieved by a method of recording information on a recording medium on which recording is performable, the recording medium including a spirally or concentrically formed recording region, the method including the steps of: (a) determining, in recording user data, whether a recording capacity of a specific region satisfies a predetermined condition based on a predetermined capacity, the specific region being formed on a recording starting position side of an end position of a region in which the user data is recorded, the specific region including the end position; and (b) forming the user data into new user data by adding dummy data to the user data so that the recording capacity is prevented from satisfying the predetermined condition if the step (a) determines that the recording capacity satisfies the predetermined condition.

According to the above-described method, in recording user data, the step (a) determines whether the recording capacity of a specific region satisfies a predetermined condition based on a predetermined capacity, the specific region being formed on the recording starting position side of the end position of the region in which the user data is recorded, the specific region including the end position. If the recording capacity satisfies the predetermined condition, the step (b) forms new user data by adding dummy data to the user data so that the recording capacity is prevented from satisfying the predetermined condition. Thereby, if the conditions for ensuring compatibility with (a device for) an information recording medium (standard) of another type include a condition relating to the amount of data recorded, for instance, it is possible to prevent the compatibility from being lost even if the amount of data is insufficient. That is, it is possible to ensure compatibility with (a device for) an information recording medium (standard) of another type.

The above objects of the present invention are also achieved by a program employed in an information processing apparatus forming, together with an information recording apparatus, an information recording system, the information recording apparatus recording information on an information recording medium on which recording is performable, the information recording medium including a spirally or concentrically formed recording region, the program causing a control computer of the information processing apparatus to execute a method, the method including the steps of: (a) acquiring, in recording user data, region information relating to the recording region of the information recording medium from the information recording apparatus; (b) obtaining a predetermined position based on the region information and determining whether an end position of a region in which the user data is recorded in the recording region is in a specific region formed on a recording starting position side of the predetermined position; and (c) forming the user data into new user data by adding dummy data to the user data so that the end position is excluded from the specific region if the step (b) determines that the end position is in the specific region.

The above objects of the present invention are also achieved by a program employed in an information processing apparatus forming, together with an information recording apparatus, an information recording system, the information recording apparatus recording information on an information recording medium on which recording is performable, the information recording medium including a spirally or concentrically formed recording region, the program causing a control computer of the information processing apparatus to execute a method, the method including the steps of: (a) acquiring, in recording user data, region information relating to the recording region of the information recording medium from the information recording apparatus; (b) obtaining a predetermined capacity based on the region information and determining whether a recording capacity of a specific region satisfies a predetermined condition based on the predetermined capacity, the specific region being formed on a recording starting position side of an end position of a region in which the user data is recorded, the specific region including the end position; and (c) forming the user data into new user data by adding dummy data to the user data so that the recording capacity is prevented from satisfying the predetermined condition if the step (b) determines that the recording capacity satisfies the predetermined condition.

The above objects of the present invention are also achieved by a program employed in an information recording apparatus forming, together with an information processing apparatus, an information recording system, the information recording apparatus recording information on an information recording medium on which recording is performable, the information recording medium including a spirally or concentrically formed recording region, the program causing a control computer of the information recording apparatus to execute a method, the method including the steps of: (a) acquiring, in recording user data, the user data from the information processing apparatus; (b) determining whether an end position of a region in which the user data is recorded in the recording region is in a specific region formed on a recording starting position side of a predetermined position; and (c) forming the user data into new user data by adding dummy data to the user data so that the end position is excluded from the specific region if the step (b) determines that the end position is in the specific region.

The above objects of the present invention are also achieved by a program employed in an information recording apparatus forming, together with an information processing apparatus, an information recording system, the information recording apparatus recording information on an information recording medium on which recording is performable, the information recording medium including a spirally or concentrically formed recording region, the program causing a control computer of the information recording apparatus to execute a method, the method including the steps of: (a) acquiring, in recording user data, the user data from the information processing apparatus; (b) determining whether a recording capacity of a specific region satisfies a predetermined condition based on a predetermined capacity, the specific region being formed on a recording starting position side of an end position of a region in which the user data is recorded, the specific region including the end position; and (c) forming the user data into new user data by adding dummy data to the user data so that the recording capacity is prevented from satisfying the predetermined condition if the step (c) determines that the recording capacity satisfies the predetermined condition.

According to the above described programs, if the conditions for ensuring compatibility with (a device for) an information recording medium (standard) of another type include a condition relating to the amount of data recorded, for instance, it is possible to prevent the compatibility from being lost even if the amount of data is insufficient. That is, it is possible to ensure compatibility with (a device for) an information recording medium (standard) of another type.

The above objects of the present invention are also achieved by a computer-readable recording medium storing a program employed in an information processing apparatus forming, together with an information recording apparatus, an information recording system, the information recording apparatus recording information on an information recording medium on which recording is performable, the information recording medium including a spirally or concentrically formed recording region, the program causing a control computer of the information processing apparatus to execute a method, the method including the steps of: (a) acquiring, in recording user data, region information relating to the recording region of the information recording medium from the information recording apparatus; (b) obtaining a predetermined position based on the region information and determining whether an end position of a region in which the user data is recorded in the recording region is in a specific region formed on a recording starting position side of the predetermined position; and (c) forming the user data into new user data by adding dummy data to the user data so that the end position is excluded from the specific region if the step (b) determines that the end position is in the specific region.

The above objects of the present invention are also achieved by a computer-readable recording medium storing a program employed in an information recording apparatus forming, together with an information recording apparatus, an information recording system, the information recording apparatus recording information on an information recording medium on which recording is performable, the information recording medium including a spirally or concentrically formed recording region, the program causing a control computer of the information processing apparatus to execute a method, the method including the steps of: (a) acquiring, in recording user data, region information relating to the recording region of the information recording medium from the information recording apparatus; (b) obtaining a predetermined capacity based on the region information and determining whether a recording capacity of a specific region satisfies a predetermined condition based on the predetermined capacity, the specific region being formed on a recording starting position side of an end position of a region in which the user data is recorded, the specific region including the end position; and (c) forming the user data into new user data by adding dummy data to the user data so that the recording capacity is prevented from satisfying the predetermined condition if the step (b) determines that the recording capacity satisfies the predetermined condition.

The above objects of the present invention are also achieved by a computer-readable recording medium storing a program employed in an information recording apparatus forming, together with an information processing apparatus, an information recording system, the information recording apparatus recording information on an information recording medium on which recording is performable, the information recording medium including a spirally or concentrically formed recording region, the program causing a control computer of the information recording apparatus to execute a method, the method including the steps of: (a) acquiring, in recording user data, the user data from the information processing apparatus; (b) determining whether an end position of a region in which the user data is recorded in the recording region is in a specific region formed on a recording starting position side of a predetermined position; and (c) forming the user data into new user data by adding dummy data to the user data so that the end position is excluded from the specific region if the step (b) determines that the end position is in the specific region.

The above objects of the present invention are also achieved by a computer-readable recording medium storing a program employed in an information recording apparatus forming, together with an information processing apparatus, an information recording system, the information recording apparatus recording information on an information recording medium on which recording is performable, the information recording medium including a spirally or concentrically formed recording region, the program causing a control computer of the information recording apparatus to execute a method, the method including the steps of: (a) acquiring, in recording user data, the user data from the information processing apparatus; (b) determining whether a recording capacity of a specific region satisfies a predetermined condition based on a predetermined capacity, the specific region being formed on a recording starting position side of an end position of a region in which the user data is recorded, the specific region including the end position; and (c) forming the user data into new user data by adding dummy data to the user data so that the recording capacity is prevented from satisfying the predetermined condition if the step (c) determines that the recording capacity satisfies the predetermined condition.

According to the above-described computer-readable recording media, the compatibility with (a device for) an information recording medium (standard) of another type can be ensured by causing a computer to executed the stored programs.

The above objects of the present invention are also achieved by an information processing apparatus capable of accessing an information recording medium on which recording is performable, the information recording medium including a spirally or concentrically formed recording region, the information processing apparatus including: an acquisition part that, in recording user data, acquires region information relating to the recording region of the information recording medium from an external apparatus; a determination part that obtains a predetermined position based on the region information and determines whether an end position of a region in which the user data is recorded in the recording region is in a specific region formed on a recording starting position side of the predetermined position; and an addition part that forms the user data into new user data by adding dummy data to the user data so that the end position is excluded from the specific region if the determination part determines that the end position is in the specific region.

The above objects of the present invention are also achieved by an information processing apparatus capable of accessing an information recording medium on which recording is performable, the information recording medium including a spirally or concentrically formed recording region, the information processing apparatus including: an acquisition part that, in recording user data, acquires region information relating to the recording region of the information recording medium from an external apparatus; a determination part that obtains a predetermined capacity based on the region information and determines whether a recording capacity of a specific region satisfies a predetermined condition based on the predetermined capacity, the specific region being formed on a recording starting position side of an end position of a region in which the user data is recorded, the specific region including the end position; and an addition part that forms the user data into new user data by adding dummy data to the user data so that the recording capacity is prevented from satisfying the predetermined condition if the determination part determines that the recording capacity satisfies the predetermined condition.

According to the above-described information processing apparatuses, if the conditions for ensuring compatibility with (a device for) an information recording medium (standard) of another type include a condition relating to the amount of data recorded, for instance, it is possible to prevent the compatibility from being lost even if the amount of data is insufficient. That is, it is possible to ensure compatibility with (a device for) an information recording medium (standard) of another type.

The above objects of the present invention are also achieved by an information recording apparatus for recording information on an information recording medium on which recording is performable, the information recording medium including a spirally or concentrically formed recording region, the information recording apparatus including: an acquisition part that, in recording user data, acquires the user data from an external apparatus; a determination part that determines whether an end position of a region in which the user data is recorded in the recording region is in a specific region formed on a recording starting position side of a predetermined position; and an addition part that forms the user data into new user data by adding dummy data to the user data so that the end position is excluded from the specific region if the determination part determines that the end position is in the specific region.

The above objects of the present invention are also achieved by an information recording apparatus for recording information on an information recording medium on which recording is performable, the information recording medium including a spirally or concentrically formed recording region, the information recording apparatus including: an acquisition part that, in recording user data, acquires the user data from an external apparatus; a determination part that determines whether a recording capacity of a specific region satisfies a predetermined condition based on a predetermined capacity, the specific region being formed on a recording starting position side of an end position of a region in which the user data is recorded, the specific region including the end position; and an addition part that forms the user data into new user data by adding dummy data to the user data so that the recording capacity is prevented from satisfying the predetermined condition if the determination part determines that the recording capacity satisfies the predetermined condition.

According to the above-described information recording apparatuses, if the conditions for ensuring compatibility with (a device for) an information recording medium (standard) of another type include a condition relating to the amount of data recorded, for instance, it is possible to prevent the compatibility from being lost even if the amount of data is insufficient. That is, it is possible to ensure compatibility with (a device for) an information recording medium (standard) of another type.

The above objects of the present invention are also achieved by an information recording system for recording information on an information recording medium on which recording is performable, the information recording medium including a spirally or concentrically formed recording region, the information recording system including: an information processing apparatus; and an information recording apparatus recording the information on the information recording medium in accordance with an instruction from the information processing apparatus, wherein the information processing apparatus includes: an acquisition part that, in recording user data, acquires region information relating to the recording region of the information recording medium from the information recording apparatus; a determination part that obtains a predetermined position based on the region information and determines whether an end position of a region in which the user data is recorded in the recording region is in a specific region formed on a recording starting position side of the predetermined position; and an addition part that forms the user data into new user data by adding dummy data to the user data so that the end position is excluded from the specific region if the determination part determines that the end position is in the specific region.

The above objects of the present invention are also achieved by an information recording system for recording information on an information recording medium on which recording is performable, the information recording medium including a spirally or concentrically formed recording region, the information recording system including: an information processing apparatus; and an information recording apparatus recording the information on the information recording medium in accordance with an instruction from the information processing apparatus, wherein the information processing apparatus includes: an acquisition part that, in recording user data, acquires region information relating to the recording region of the information recording medium from the information recording apparatus; a determination part that obtains a predetermined capacity based on the region information and determines whether a recording capacity of a specific region satisfies a predetermined condition based on the predetermined capacity, the specific region being formed on a recording starting position side of an end position of a region in which the user data is recorded, the specific region including the end position; and an addition part that forms the user data into new user data by adding dummy data to the user data so that the recording capacity is prevented from satisfying the predetermined condition if the determination part determines that the recording capacity satisfies the predetermined condition.

The above objects of the present invention are also achieved by an information recording system for recording information on an information recording medium on which recording is performable, the information recording medium including a spirally or concentrically formed recording region, the information recording system including: an information recording apparatus recording the information on the information recording medium; and an information processing apparatus controlling the information recording apparatus, wherein the information recording apparatus includes: an acquisition part that, in recording user data, acquires the user data from the information processing apparatus; a determination part that determines whether an end position of a region in which the user data is recorded in the recording region is in a specific region formed on a recording starting position side of a predetermined position; and an addition part that forms the user data into new user data by adding dummy data to the user data so that the end position is excluded from the specific region if the determination part determines that the end position is in the specific region.

The above objects of the present invention are further achieved by an information recording system for recording information on an information recording medium on which recording is performable, the information recording medium including a spirally or concentrically formed recording region, the information recording system including: an information recording apparatus recording the information on the information recording medium; and an information processing apparatus controlling the information recording apparatus, wherein the information recording apparatus includes: an acquisition part that, in recording user data, acquires the user data from the information processing apparatus; a determination part that determines whether a recording capacity of a specific region satisfies a predetermined condition based on a predetermined capacity, the specific region being formed on a recording starting position side of an end position of a region in which the user data is recorded, the specific region including the end position; and an addition part that forms the user data into new user data by adding dummy data to the user data so that the recording capacity is prevented from satisfying the predetermined condition if the determination part determines that the recording capacity satisfies the predetermined condition.

According to the above-described information recording systems, if the conditions for ensuring compatibility with (a device for) an information recording medium (standard) of another type include a condition relating to the amount of data recorded, for instance, it is possible to prevent the compatibility from being lost even if the amount of data is insufficient. That is, it is possible to ensure compatibility with (a device for) an information recording medium (standard) of another type.

BRIEF DESCRIPTION OF THE DRAWINGS

Other objects, features and advantages of the present invention will become more apparent from the following detailed description when read in conjunction with the accompanying drawings, in which:

FIG. 3 is a diagram showing a formatted state of a DVD+R by multi-session formatting according to the first embodiment of the present invention;

FIG. 4 is a table for illustrating the outline of the data structure of the DVD+R of the multi-session format according to the first embodiment of the present invention;

FIG. 5 is a table for illustrating the details of the data structure of a DVD+R of a single-session format according to the first embodiment of the present invention;

FIG. 6 is a table for illustrating a data structure of a TOC zone on the DVD+R according to the first embodiment of the present invention;

FIG. 7 is a table for illustrating a data structure of a TOC item in the TOC zone according to the first embodiment of the present invention;

FIG. 9 is a table showing physical sector numbers of a DVD+R disk and their radial positions on the disk according to the first embodiment of the present invention;

FIG. 15 is a flowchart for illustrating a user data recording operation according to the second embodiment of the present invention; and FIG. 16 is a flowchart for illustrating a user data recording operation according to a third embodiment of the present invention.

DETAILED DESCRIPTION OF THE PREFERRED EMBODIMENTS

A description will be given, with reference to the accompanying drawings, of embodiments of the present invention.

First Embodiment

Figure 1:
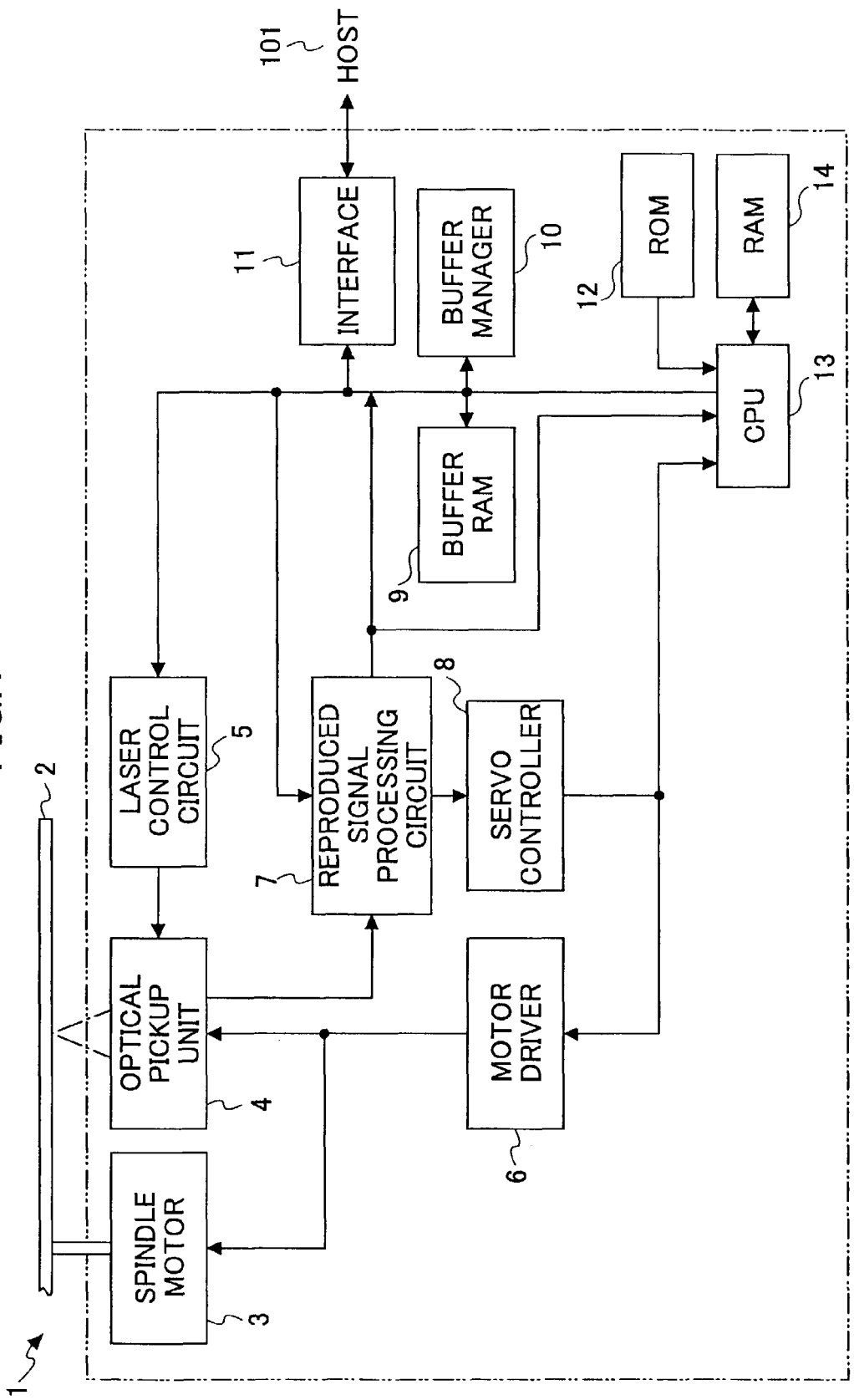
FIG. 1 is a block diagram showing an optical disk unit as an information recording apparatus according to a first embodiment of the present invention.

FIG. 1 is a block diagram showing an optical disk unit 1 as an information recording apparatus according to a first embodiment of the present invention.

The optical disk unit 1 includes a spindle motor 3 rotating an optical disk 2 as an information recording medium, an optical pickup unit 4, a laser control circuit 5, a motor driver 6, a reproduced signal processing circuit 7, a servo controller 8, a buffer RAM 9, a buffer manager 10, an interface 11, a ROM 12, a CPU 13, and a RAM 14. The arrows in FIG. 1 show typical signal and information flows, but do not represent all the connections between the blocks.

More specifically, as the optical disk 2, an information recording medium based on the DVD+R standard (hereinafter referred to simply as a DVD+R) is considered.

The optical pickup unit 4 includes a semiconductor laser as a light source, an optical system including an objective lens, a light receiver, and a driving system. The optical system guides a laser beam emitted from the semiconductor laser to the recording surface of the optical disk 2, and guides a returning light beam reflected from the recording surface to a predetermined light-receiving position. The light receiver is provided at the light-receiving position to receive the returning light beam. The driving system includes a focusing actuator, a tracking actuator, and a seek motor (none of which is shown in the drawing). The light receiver outputs a current (current signal) corresponding to the amount of light received to the reproduced signal processing circuit 7.

The servo controller 8, based on a focus error signal, generates a control signal that controls the focusing actuator of the optical pickup unit 4. Further, the servo controller 8, based on a tracking error signal, generates a control signal that controls the tracking actuator of the optical pickup unit 4. The control signals are output from the servo controller 8 to the motor driver 6.

The motor driver 6 drives the focusing actuator and the tracking actuator of the optical pickup unit 4 based on the control signals supplied from the servo controller 8. Further, the motor driver 6 controls the spindle motor 3 based on an instruction from the CPU 13 so that the optical disk 2 is rotated at a constant linear velocity. Furthermore, the motor driver 6 drives the seek motor of the optical pickup unit 4 based on an instruction from the CPU 13 so that the optical pickup unit 4 is moved radially to a target track on the optical disk 2.

The interface 11 is a two-way communication interface with a host that is an external apparatus (for instance, a PC 101 shown in FIG. 2 as an information processing apparatus), and is based on an interface standard such as ATAPI (AT Attachment Packet Interface) or SCSI (Small Computer System Interface).

The CPU 13, together with the ROM 12 and the RAM 14, forms a microcomputer (computer) included in the optical disk unit 1. The ROM 12, which also functions as a storage medium, stores programs including a below-described control program written in codes decodable by the CPU 13. The CPU 13 controls the operations of the above-described elements of the optical disk unit 1 in accordance with the programs stored in the ROM 12, and temporarily stores data necessary for the control in the RAM 14. When the optical disk unit 1 is turned on, the programs stored in the ROM 12 are loaded into (installed in) the main memory (not shown in the drawing) of the CPU 13. The control operations performed by the CPU 13 include an operation of performing recording on the DVD+R that is the optical disk 2 by the multi-session layout and an operation of checking data recording capacity at the time of closing the first (initial) session on the disk and extending terminal end information (a closure) in closing the first session if the checking result shows that the data recording capacity is not large enough.

Figure 2:
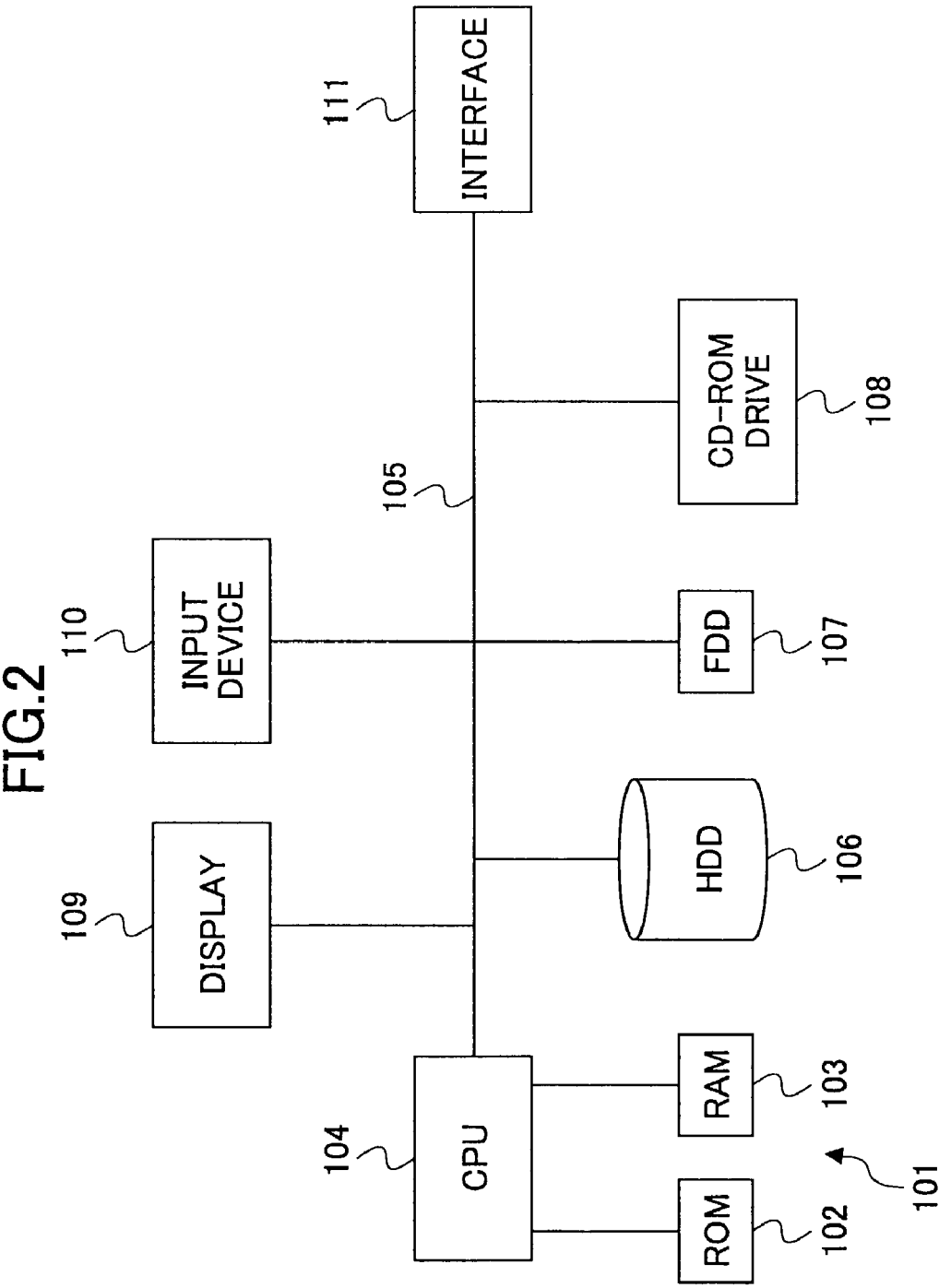
FIG. 2 is a block diagram showing a PC as an information processing apparatus connected to the optical disk unit of FIG. 1 according to the first embodiment of the present invention.

Next, a description will be given of the PC 101 as an information processing apparatus. Here, PC is an abbreviation for personal computer. FIG. 2 is a block diagram showing the PC 101 connected to the optical disk unit 1.

The PC 101 includes a ROM 102, a RAM 103, and a CPU 104 that form a microcomputer. Each component of the PC 101 is connected to the CPU 104 via a bus line 105. Fixed data are recorded in the ROM 102 so as not to be varied. Variable data are recorded in the RAM 103 so as to be variable. The PC 101 also includes an HDD (hard disk drive) 106, an FDD (flexible disk drive) 107, and a CD-ROM drive 108. These storage devices are connected via the bus line 105 to the microcomputer. The HDD 106 stores an OS (operating system) and various application programs, part of which are copied to the RAM 103 at the time of activating the PC 101 so as to be used by the CPU 104 to control each part of the PC 101.

The PC 101 further includes a display 109, an input device formed of a keyboard and/or a mouse, and an interface 111 that are connected to the CPU 104 via the bus line 105. The PC 101 is connectable to an external apparatus through the interface 111. The optical disk unit 1, for instance, is also connected to the PC 101 via the interface 111.

FIG. 3 is a diagram showing a formatted state of the DVD+R optical disk 2 by multi-session formatting. FIG. 3 shows the state where three sessions 201-1, 201-2, and 201-3, that is, SESSION 1, SESSION 2, and SESSION 3, are generated on the optical disk 2 and the remaining region is unrecorded. As shown in FIG. 3, in the DVD+R, recording is performed from the center to the periphery of the disk. The first session 201-1 is composed of a lead-in 211, a data zone (area) 221-1, and a closure 231-1. The next session 201-2 is composed of an intro 212-1, a data zone 221-2, and a closure 231-2. The last session 201-3 is composed of an intro 212-2, a data zone 221-3, and a lead-out 232.

FIG. 4 is a table for illustrating the outline of the data structure of the DVD+R optical disk 2 of the multi-session format. The multi-session format, which is only schematically shown in FIG. 3, is illustrated in detail in FIG. 4. On the DVD+R optical disk 2, first, an inner drive area 241 is recorded as the first recording contents starting from the center side of the disk. Then, the sessions 201-1 through 201-N (201-3 in the case of FIG. 3) are recorded subsequent to the inner drive area 241. Finally, an outer drive area 251 is recorded as the last recording contents subsequent to the last session 201-N shown as SESSION N in FIG. 4.

FIG. 5 is a table for illustrating the details of the data structure of a DVD+R of a single-session format. In FIG. 4, some recording contents of the DVD+R optical disk 2 are omitted. Since the omitted part of the data structure of FIG. 4 is also included in the data structure of FIG. 5, a description will be given of the data structure in the DVD+R optical disk 2 of the multi-session format also with reference to FIG. 5.

First, a description will be given of the inner drive area 241. The recording contents shown in FIG. 5 are recorded in the inner drive area 241. Particularly, a TOC zone 242 is provided at the end of the inner drive area 241. Information on the management of the entire optical disk 2 is recorded in the TOC zone 242.

FIG. 6 is a table for illustrating a data structure of the TOC zone 242, and FIG. 7 is a table for illustrating a data structure of a TOC item 243 in the TOC zone 242. The contents of the TOC zone 242 are as shown in FIG. 6. The areas shown as RESERVED in FIG. 6 are unused areas 1001-1. A plurality of TOC items 243 are recorded in the TOC zone 242, and the contents of each TOC item 243 are as shown in FIG. 7. As is apparent from FIG. 7, each TOC item 243 includes the unused region 1001-2 shown as RESERVED.

Next, a description will be given of the lead-in 211 in the first session 201-1. The contents recorded in the lead-in 211 are as shown in FIG. 5. Of the recording (recorded) contents, those shown as Guard Zones, Reserved Zones, and Buffer Zones are unused regions 1001-3.

Next, desired data can be freely written to the data zone 221-1 in the first session 201-1. Desired data can also be freely written to the data zone 221 of each session 201 (each of the sessions 201-1 through 201-N).

In the closure 231 following this data zone 221, a buffer zone 233 and an outer session identification zone 234 are recorded. The buffer zone 233 is an unused region 1001-4.

Next, in the second session 201-2, the intro 212-1 is recorded instead of the lead-in 211. The intro 212-1 includes buffer zones 213, which are unused regions 1001-5.

Further, in the last session 201-N, the lead-out 232 is recorded instead of the closure 231. The contents recorded in the lead-out 232 are as shown in FIG. 5.

In addition, the contents of the outer drive area 251 recorded as the last recording contents subsequent to the last session 201-N are as shown in FIG. 5.

Figure 8:
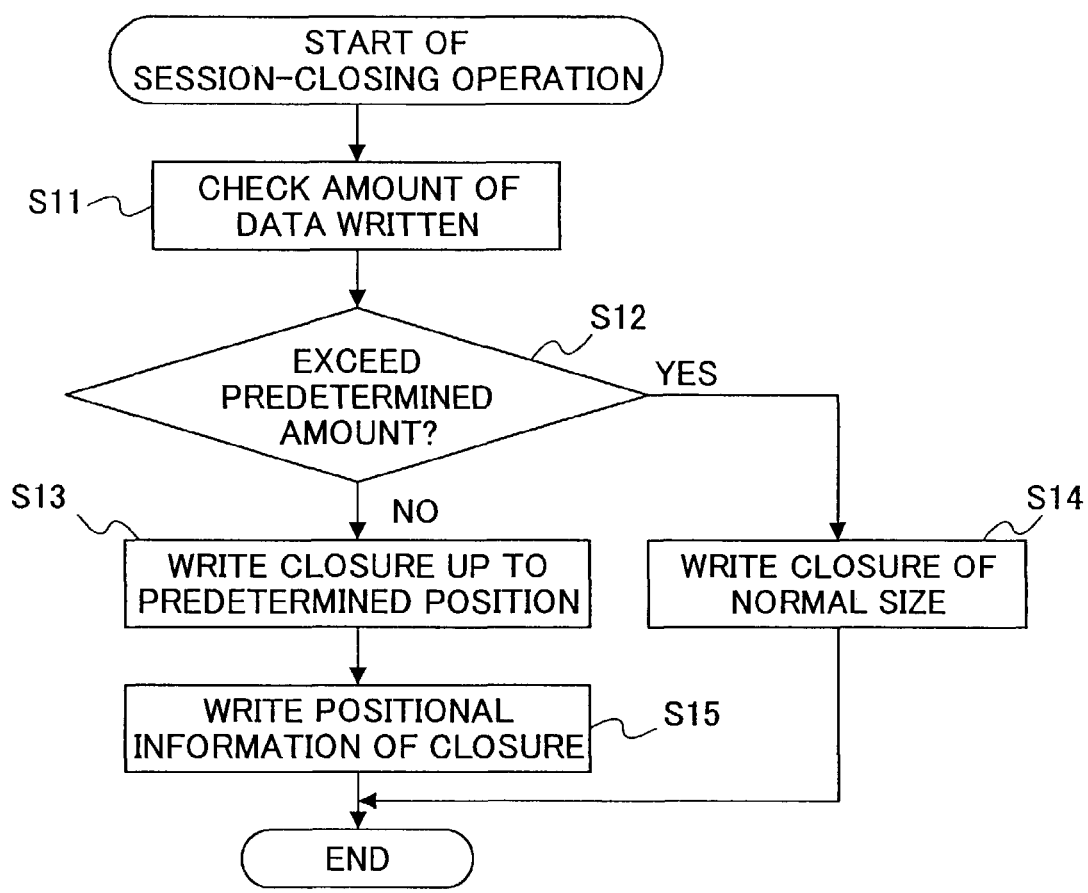
FIG. 8 is a flowchart showing the flow of a session-closing operation according to the first embodiment of the present invention.

FIG. 8 is a flowchart showing the flow of a session-closing operation, more specifically, a session-closing operation on the first session 201-1. The session-closing operation is performed, for instance, by the CPU 13 of the optical disk unit 1 in accordance with a computer program recorded as firmware in the ROM 12 of the optical disk unit 1. In this case, the ROM 12 serves as a storage medium storing the computer program.

Alternatively, the session-closing operation may be performed by the CPU 104 of the PC 101 transmitting an operation command to the optical disk unit 1 in accordance with a computer program copied from the HDD 106 of the PC 101 to the RAM 103 when the PC 101 is activated. In this case, the computer program copied to the RAM 103 of the PC 101 may be stored in the HDD 106 or incorporated in the OS in the form of an application program. Such an application program is recorded on a recording medium such as an FD or a CD-ROM to be distributed, for instance, and is read by the FDD 107 or the CD-ROM drive 108 of the PC 101 to be stored in the HDD 106. Accordingly, in this case, the HDD 106, the RAM 103, and the FD or the CD-ROM serve as storage media storing the computer program.

According to the above-describe two cases, either the optical disk unit 1 or the PC 101 serves as a computer performing the operation in accordance with the flowchart of FIG. 8 characteristic of this embodiment. However, the system may be constructed so that the operation is performed in accordance with computer programs stored separately in the optical disk unit 1 and the PC 101. Anyway, in the case of performing all or part of the session-closing operation on the PC 101 side, a computer program that enables the optical disk unit 1 to perform the operation shown in FIG. 8 is installed in the PC 101.

A description will be given of the session-closing operation. It is ensured that prior to the session-closing operation, the optical disk unit 4 performs the step (function) of recording data on the data zone 221-1 in the first session 201-1, which is the initial recording section. In the following description, the first session 201-1 is referred to by reference numeral 201 for convenience of description, and the other related elements of the optical disk 2 are referred to accordingly. Successively after the data recording on the data zone 221 in the first session 201, the optical disk unit 1 performs the step of recording the closure 231, which is a terminal end information indicating the end of the first session 201.

In recording the closure 231, in step S11 of FIG. 8, the amount of data written is checked. In step S12, it is determined whether the amount of data written exceeds a predetermined amount. If the amount of data written does not exceed the predetermined amount (that is, "NO" in step S12), in step S13, the closure 231 is written, extended to a predetermined position. If the amount of data written exceeds the predetermined amount (that is, "YES" in step S12), in step S14, the closure 231 of a normal size is written.

That is, the operation of steps S11 and S12 is the step of determining whether the closure 231 recorded on the optical disk 2 reaches a specified region beyond a predetermined range from the center of the optical disk 2. This operation is required because if data is not recorded in the region up to a radial position at least approximately 30 mm from the rotational center of the optical disk 2, the data cannot be read out normally in a DVD-ROM drive, for in the DVD-ROM disks, information is supposed to be recorded up to a radial position 35 mm from the rotational center of the disk. That is, according to this embodiment, in recording information in the first session 201 on the DVD+R optical disk 2, the information is recorded so that the DVD+R optical disk 2 is compatible with the DVD-ROM drives, that is, the information is also reproducible in the DVD-ROM drives.

Therefore, according to this embodiment, in steps S11 and S12, it is determined whether the closure 231 recorded on the optical disk 2 reaches a specified region beyond a predetermined range from the center of the optical disk 2, that is, it is determined whether the closure 231 reaches the region of the 30 mm radial position of the optical disk 2 which region, if information is recorded up to the region, allows the DVD-ROM drives to perform a normal reading operation on the optical disk 2. If it is determined that the closure 231 does not reach the region, in step S13, the closure 231 is extended up to a predetermined position, namely, the region of the 30 mm radial position of the optical disk 2, and then is written. That is, the operation of step S13 is the step of recording the closure 231 so that the closure 231 reaches a specified region in the step of recording the closure 231 if it is determined that the closure 231 does not reach the specified region.

At this point, in step S11, the amount of data written is checked for determining whether the closure 231 recorded on the optical disk 2 reaches the region of the 30 mm radial position from the center of the optical disk 2. That is, the amount of data recorded in the inner drive area 241 and recorded up to the terminal end of the closure 231 in the first session 201 is calculated, so that it is determined from the calculated amount of data whether the closure 231 recorded on the optical disk 2 reaches the region of the 30 mm radial position from the center of the optical disk 2. At this point, in order to determine from the amount of data the position that the data reaches, the relationship between the position and the amount of data may be stored in a program stored in any storage region such as the ROM 12 of the optical disk unit 1 or the HDD 106 of the PC 101. The contents of the relationship are as shown in FIG. 9, for instance.

FIG. 9 is a table showing physical sector numbers of a DVD+R disk and their radial positions on the disk. As shown in FIG. 9, the 30 mm radial position on the disk is located between the physical sector numbers 71000 and 72000. Therefore, for instance, it may be determined in step S12 of FIG. 8 that the amount of data written exceeds a predetermined amount if the physical sector number is larger than or equal to 72000. Needless to say, "larger than or equal to" does not mean the specific contents of the operation, but merely signifies the conceptual contents of the operation. Accordingly, the operation of determining whether the amount of data is larger than or equal to a physical sector number such as 72000, the operation of determining whether the amount of data is smaller than or equal to a physical sector number, or the operation of determining whether the amount of data exceeds a physical sector number may be performed as a specific operation.

A variety of methods may be employed as the operation of extending the closure 231 in step S13. A description will be given, with reference to FIGS. 10 through 13, of three methods of extending the closure 231.

Figure 10:
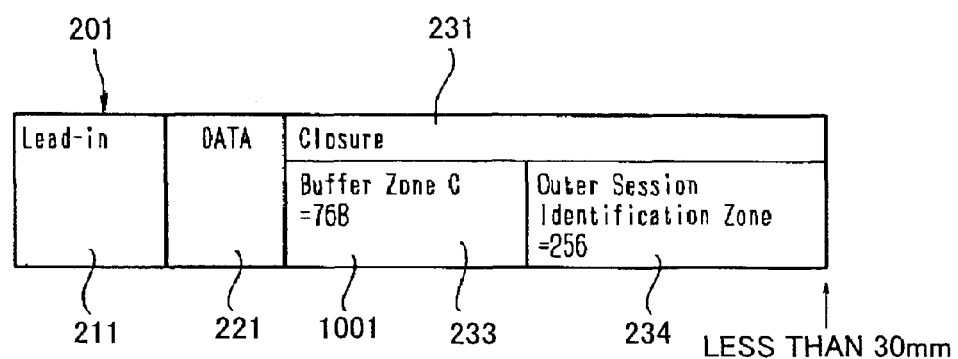
FIG. 10 is a diagram showing the conventional data structure of a closure on the DVD+R according to the first embodiment of the present invention.
Figure 11:
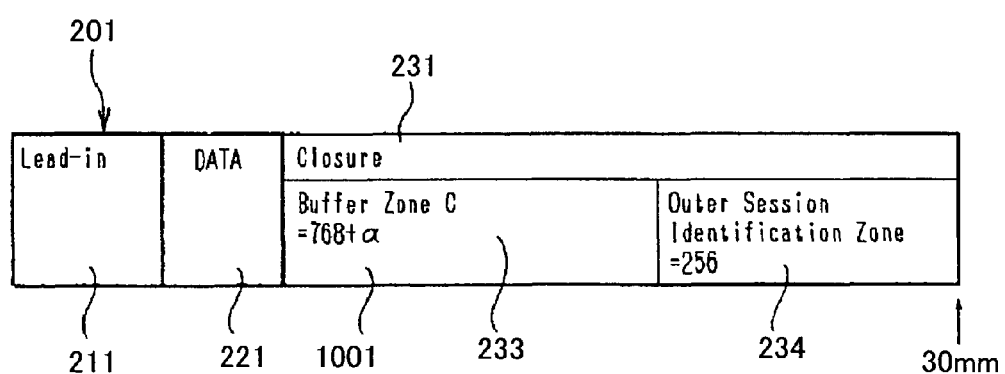
FIG. 11 is a diagram showing a data structure of the closure as extended terminal end information according to the first embodiment of the present invention.
Figure 12:
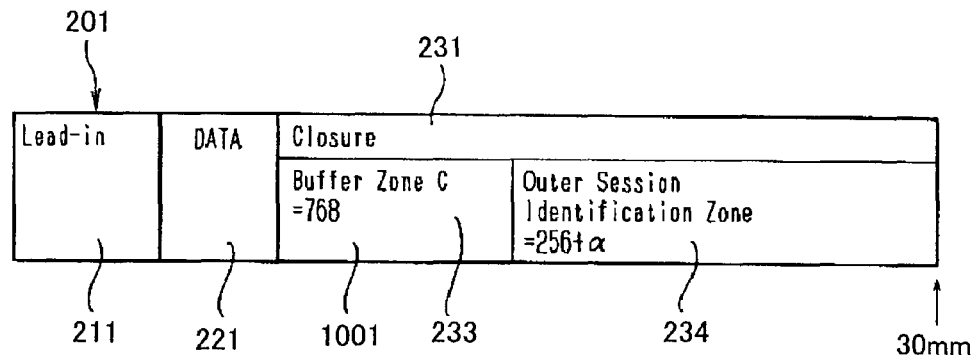
FIG. 12 is a diagram showing another data structure of the closure as the extended terminal end information according to the first embodiment of the present invention.
Figure 13:
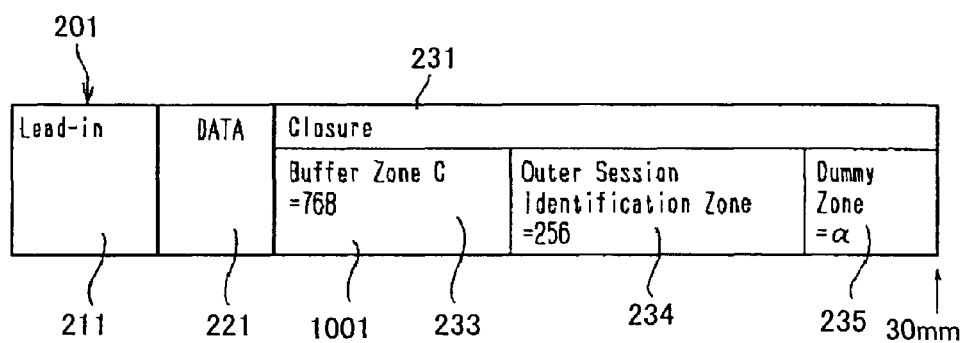
FIG. 13 is a diagram showing yet another data structure of the closure as the extended terminal end information according to the first embodiment of the present invention.

FIG. 10 is a diagram showing the conventional data structure of the closure 231. FIG. 11 is a diagram showing a data structure of the closure 231 as extended terminal end information. FIG. 12 is a diagram showing another data structure of the closure 231 as the extended terminal end information. FIG. 13 is a diagram showing yet another data structure of the closure 231 as the extended terminal end information.

As shown in FIG. 4, the closure 231 is composed of the buffer zone 233 and the outer session identification zone 234. Conventionally, the number of physical sectors of the buffer zone 233 and the number of physical sectors of the outer session identification zone 234 are 768 and 256, respectively, as shown in FIGS. 4 and 10. Meanwhile, in extending the closure 231 in step S13 of FIG. 8, the buffer zone 233 may be extended as shown in FIG. 11, the outer session identification zone 234 may be extended as shown in FIG. 12, or another buffer zone (dummy zone) 235 may be added after the outer session identification zone 234 as shown in FIG. 13. In any case, the amount of extension of the closure 231 is such that the closure 231 reaches the region of the 30 mm radial position from the center of the optical disk 2.

In the case of extending the buffer zone 233 as shown in FIG. 11 and in the case of adding the dummy zone 235 after the outer session identification zone 234 as shown in FIG. 13, "0s," for instance, may be recorded in series. On the other hand, in the case of extending the outer session identification zone 234 as shown in FIG. 12, it is also possible to employ the technique of recording, for instance, "0s" in series, while it is employable to keep on repeating the copying of data to be copied in the outer session identification zone 234.

Thus, according to this embodiment, even if the amount of data recorded in the data zone 221 in the first session is small, the data can be recorded up to a specified region beyond a predetermined range, for instance, the 30 mm radial position, from the center of the optical disk 2. Accordingly, the DVD-ROM drives for reproducing data from DVD-ROMs, which are prevented from performing a reading operation normally if data is not recorded on the optical disk 2 up to a specified region beyond a predetermined range from the center of the optical disk 2, can be provided with a normal data reproducing function.

Referring back to the flowchart of FIG. 8, in step S15 after step S13, information on the position of the closure 231 is written in an unused region 1001 of the optical disk 2. Normally, the closure 231 has the amount of data as shown in FIG. 10. Therefore, if there is a change in the length of the closure 231, the starting position of the next session 201 may not be determined in the optical disk unit 1. Accordingly, in this embodiment, the positional information of the closure 231 is written in the unused region 1001 of the optical disk 2 in step S15, so that the starting position of the next session 201 can be indicated easily.

As the unused region 1001 of the optical disk 2, any of the unused regions 1001-3 in the lead-in 211 shown in FIG. 5, such as Guard Zones, Reserved Zones, or Buffer Zones, the buffer zone 233 that is the unused region 1001-4 in the closure 231 shown in FIG. 4, any of the buffer zones 213 that are the unused regions 1001-5 in the intro 212 shown in FIG. 4, or any of the unused regions 1001-1 and 1001-2 (RESERVED in FIGS. 6 and 7) in the TOC zone 242 may be employed.

In this embodiment, the description is given of the case where the optical disk 2 is a DVD+R. The optical disk 2, however, is not limited to the DVD+R, but may be any information recording medium that is divided into a plurality of recording divisions such as sessions in recording data.

Further, the optical disk unit 1 of this embodiment may be of a built-in type so as to be provided in the same housing as the PC 101. Alternatively, the optical disk unit 1 may be provided in a housing different from that of the PC 101 as an external device.

Second Embodiment

A description will now be given, with reference to FIGS. 14 and 15, of a second embodiment of the present invention.

Figure 14:
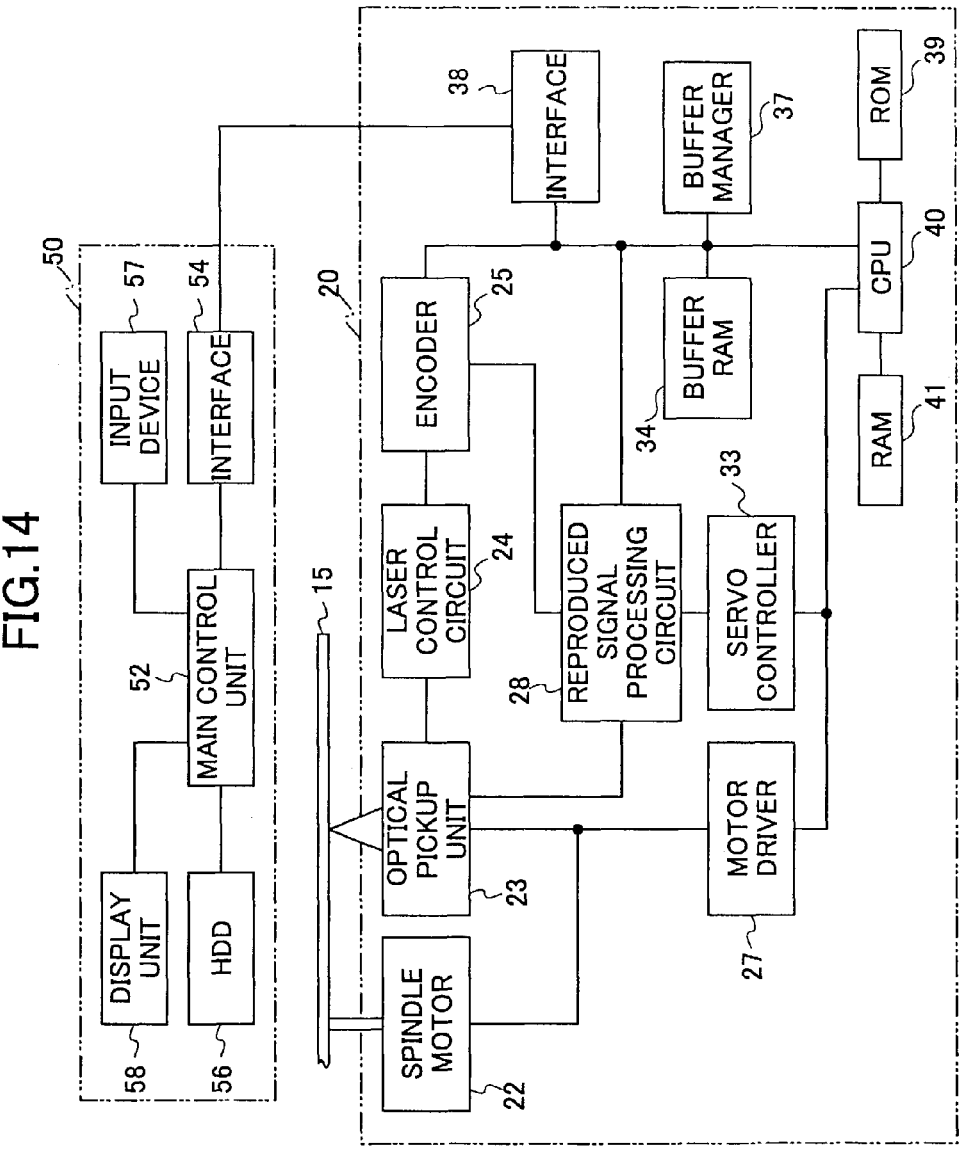
FIG. 14 is a block diagram showing an information recording system according to a second embodiment of the present invention.

FIG. 14 is a block diagram showing an information recording system according to the second embodiment of the present invention.

The information recording system of FIG. 14 includes an optical disk unit 20 as an information recording apparatus and a host 50 as an information processing apparatus controlling the optical disk unit 20.

The optical disk unit 20 includes a spindle motor 22 rotating an optical disk 15 as an information recording medium, an optical pickup unit 23, a laser control circuit 24, an encoder 25, a motor driver 27, a reproduced signal processing circuit 28, a servo controller 33, a buffer RAM 34, a buffer manager 37, an interface 38, a ROM 39, a CPU 40, and a RAM 41. The connections in FIG. 14 show typical signal and information flows, but do not represent all the connections between the blocks. In the second embodiment, an information recording medium based on the DVD+R standard, for instance, is employed as the optical disk 15.

The optical pickup unit 23 includes a semiconductor laser as a light source, an optical system including an objective lens, a light receiver, and a driving system. The optical system guides a laser beam emitted from the semiconductor laser to the recording surface of the optical disk 15, and guides a returning light beam reflected from the recording surface to a predetermined light-receiving position. The light receiver is provided at the light-receiving position to receive the returning light beam. The driving system includes a focusing actuator, a tracking actuator, and a seek motor (none of which is shown in the drawing). The light receiver outputs a current (current signal) corresponding to the amount of light received to the reproduced signal processing circuit 28.

The reproduced signal processing circuit 28 converts the current signal output from the optical pickup unit 23 to a voltage signal, and detects a wobble signal, an RF signal, and servo signals such as a focus error signal and a tracking error signal based on the voltage signal. The reproduced signal processing circuit 28 extracts ADIP information and a synchronization signal from the wobble signal. The extracted ADIP information is output to the CPU 40, and the extracted synchronization signal is output to the encoder 25. Further, after performing error correction on the RF signal, the reproduced signal processing circuit 28 stores the RF signal in the buffer RAM 34 via the buffer manager 37. The focus error signal and the tracking error signal are output from the reproduced signal processing circuit 28 to the servo controller 33.

The servo controller 33, based on the focus error signal, generates a control signal that controls the focusing actuator of the optical pickup unit 23. Further, the servo controller 33, based on the tracking error signal, generates a control signal that controls the tracking actuator of the optical pickup unit 23. The control signals are output from the servo controller 33 to the motor driver 27.

The buffer manager 37 manages the input of data to and the output of data from the buffer RAM 34. When the amount of data stored in the buffer RAM 34 reaches a predetermined value, the buffer manager 37 transmits a notification to the CPU 40.

The motor driver 27 drives the focusing actuator and the tracking actuator of the optical pickup unit 23 based on the control signals supplied from the servo controller 33. Further, the motor driver 27 controls the spindle motor 22 based on an instruction from the CPU 40 so that the optical disk 15 is rotated at a constant linear velocity. Furthermore, the motor driver 27 drives the seek motor of the optical pickup unit 23 based on an instruction from the CPU 40 so as to control the position of the optical pickup unit 23 in the sledge directions (the radial directions of the optical disk 15).

The encoder 25 extracts data stored in the buffer RAM 34 via the buffer manager 37 based on an instruction from the CPU 40, and adds an error-correcting code to the extracted data, thereby creating data to be written (writing data) to the optical disk 15. Then, based on an instruction from the CPU 40, the encoder 25 outputs the writing data to the laser control circuit 24 in synchronization with the synchronization signal supplied from the reproduced signal processing circuit 28.

The laser control circuit 24 controls the output of the semiconductor laser of the optical pickup unit 23 based on the writing data supplied from the encoder 25.

The interface 38 is a two-way communication interface with the host 50, and is based on an interface standard such as ATAPI or SCSI.

The ROM 39 stores programs written in codes decodable by the CPU 40. When the optical disk unit 20 is turned on, the programs stored in the ROM 39 are loaded into the main memory (not shown in the drawing) of the CPU 40 so that the CPU 40 controls the operation of each of the above-described components of the optical disk unit 20 in accordance with the programs.

The host 50 includes a main control unit 52, an interface 54, a hard disk drive (HDD) 56, an input device 57, and a display unit 58.

The main control unit 52 includes a microcomputer and a main memory (neither of which is shown in the drawing), and controls the entire host 50.

The interface 54 is a two-way communication interface with the optical disk unit 20, and is based on an interface standard such as ATAPI or SCSI. The interface 54 is connected to the interface 38 of the optical disk unit 20. Generally, a communication line such as a communication cable is employed as a connection medium. However, wireless communication using infrared may be established therebetween.

The HDD 56 stores programs including a program written in codes decodable by the microcomputer of the main control unit 52 and used in the later-described recording of user data (this program is hereinafter referred to as a user data recording program). When the host 50 is turned on, the programs are loaded into the main memory of the main control unit 52.

The display unit 58 includes a display part (not shown in the drawing) such as a CRT, a liquid-crystal display, or a plasma display, and displays a variety of information supplied from the main control unit 52.

The input device 57 includes at least one of input media (not shown in the drawing) such as a keyboard, a mouse, and a pointing device, and notifies the main control unit 52 of a variety of information input by a user. The information may be input wirelessly from the input medium. A CRT with a touch panel is an example integration of the display unit 58 and the input device 57.

Next, a description will be given of an operation of recording user data on the optical disk 15 in the information recording system of the above-described configuration.

A description will be given, with reference to FIG. 15, of the operation of the main control unit 52 when the main control unit 52 receives a request to record user data via the input device 57. When the recording request is input to the main control unit 52, the starting address of the program corresponding to the flowchart of FIG. 15 is set in the program counter of the microcomputer of the main control unit 52, so that the algorithm corresponding to the flowchart of FIG. 15 starts. The flowchart of FIG. 15 corresponds to a series of operation algorithms executed by the microcomputer of the main control unit 52.

First, in step S501 of FIG. 15, a WRITE command to request writing is transmitted to the optical disk unit 20 in order to record user data on the optical disk 15. Thereby, the optical disk unit 20 records the user data in a recording region of the optical disk 15 in accordance with the instruction from the host 50. The details of the operation of the optical disk unit 20 at the time of receiving the WRITE command from the host 50 will be described later.

Next, in step S503, the main control unit 52 waits until the recording of the user data is completed. When the recording of the user data is completed, the operation proceeds to step S505.

In step S505, a READ DISK INFORMATION command to request disk information is transmitted to the optical disk unit 20. When the optical disk unit 20 receives the READ DISK INFORMATION command, the optical disk unit 20 sets disk information including a session number in predetermined positions in a disk information block, and transmits the disk information block to the host 50.

In step S507, a response from the optical disk unit 20 is awaited, and when a response from the optical disk unit 20 is received, the operation proceeds to step S509.

In step S509, the disk information is extracted from the received disk information block and the session number in which the user data is to be recorded is obtained.

In step S511, it is determined whether the session number is "1." If the session number is "1" (that is "YES" in step S511), the operation proceeds to step S513.

In step S513, a READ TRACK INFORMATION command to request region information for ensuring compatibility with a DVD-ROM drive is transmitted to the optical disk unit 20. When the optical disk unit 20 receives the READ TRACK INFORMATION command, the optical disk unit 20 obtains the address information of a sector located 30 mm from the rotational center of the optical disk unit 15 as a predetermined position (hereinafter, this address information is referred to as "specific address information") and information on the number of sectors of an unrecorded region existing inside (on the recording starting position side of) the sector on the optical disk 15 (hereinafter, this information is referred to as "unrecorded sector number information"). Then, the optical disk unit 20 sets the specific address information and the unrecorded sector number information in the position of the bytes 36 through 39 and the position of the bytes 40 through 43, respectively, of a track information block, and transmits the track information block to the host 50. The track information block is hitherto defined up to the byte 35, and this time, the bytes 36 through 43 are newly defined.

In step S515, the main control unit 52 waits for a response from the optical disk unit 20. When the main control unit 52 receives a response from the optical disk unit 20, the operation proceeds to step S517.

In step S517, the region information is extracted from the track information block.

Next, in step S519, the specific address information is extracted from the region information.

Next, in step S521, the end address of the user data recorded in the recording region and the specific address are compared, and it is determined whether the value of the end address is smaller than or equal to the value of the specific address. If the value of the end address is smaller than or equal to the value of the specific address (that is, "YES" in step S521), the operation proceeds to step S523.

In step S523, dummy data is set so that the value of the end address exceeds the value of the specific address.

Next, in step S525, a WRITE command to request writing is transmitted to the optical disk unit 20 in order to record the set dummy data successively after the user data. Thereby, the operation at the time of receiving a recording request ends.

If the value of the end address exceeds the value of the specific address in step S521 (that is, "NO" in step S521), the operation at the time of receiving a recording request ends. That is, no dummy data is recorded successively after the user data.

If the session number of the session in which the user data is recorded is not "1" in step S511 (that is "NO" in step S511), the operation at the time of receiving a recording request ends. That is, no dummy data is recorded successively after the user data either in this case.

A description will be given of the operation of the optical disk unit 20 at the time of receiving a WRITE command from the host 50.

The CPU 40 outputs a control signal for controlling the rotation of the spindle motor 22 based on a specified recording rate to the motor driver 27 and notifies the reproduced signal processing circuit 28 of the reception of the WRITE command from the host 50.

When the rotation of the optical disk 15 reaches a predetermined linear velocity, the reproduced signal processing circuit 28 obtains the ADIP information based on the output signal of the optical pickup unit 23 and outputs the ADIP information to the CPU 40. At the same time, the reproduced signal processing circuit 28 detects the focus error signal and the tracking error signal based on the output signal of the optical pickup unit 23, and outputs the focus error signal and the tracking error signal to the servo controller 33.

The servo controller 33 drives the focusing actuator and the tracking actuator of the optical pickup unit 23 through the motor driver 27 based on the focus error signal and the tracking error signal supplied from the reproduced signal processing circuit 28, and corrects focus error and tracking error.

The CPU 40 stores the user data supplied from the host 50 in the buffer RAM 34 via the buffer manager 37. Then, based on the ADIP information supplied from the reproduced signal processing circuit 28, the CPU 40 outputs to the motor driver 27 a signal requesting the seek operation of the optical pickup unit 23 such that the optical pickup unit 23 is positioned at a specified writing starting point.

Receiving from the buffer manager 37 a notification that the amount of data stored in the buffer RAM 34 exceeds a predetermined value, the CPU 40 instructs the encoder 25 to create data to be written (writing data). When the CPU 40 determines based on the ADIP information that the position of the optical pickup unit 23 is the specified writing starting point, the CPU 40 transmits a notification to the encoder 25. Then, the encoder 25 records the writing data onto the optical disk 15 through the laser control circuit 24 and the optical pickup unit 23.

Until the end of the recording operation, as previously described, the reproduced signal processing circuit 28 detects the focus error signal and the tracking error signal based on the output signal of the optical pickup unit 23, and corrects focus error and tracking error via the servo controller 33 and the motor driver 27 whenever necessary.

Next, a brief description will be given of the operation of the optical pickup unit 23 at the time of receiving a READ command to request reproduction from the host 50.

The CPU 40 outputs to the motor driver 27 a control signal for controlling the rotation of the spindle motor 22 based on a reproduction rate, and notifies the reproduced signal processing circuit 28 of the reception of the READ command from the host 50.

The reproduced signal processing circuit 28 transmits the ADIP information to the CPU 40 and corrects focus error and tracking error as in the above-described case of recording user data.

Based on the ADIP information, the CPU 40 outputs to the motor driver 27 a signal requesting the seek operation of the optical pickup unit 23 such that the optical disk unit 23 is positioned at a specified reading starting point. When the CPU 40 determines based on the ADIP information that the position of the optical pickup unit 23 is the specified reading starting point, the CPU 40 transmits a notification to the reproduced signal processing circuit 28.

Then, the reproduced signal processing circuit 28 detects the RF signal based on the output signal of the optical pickup unit 23, performs error correction on the RF signal, and thereafter, stores the RF signal in the buffer RAM 34. Until the end of the reproduction operation, the reproduced signal processing circuit 28, as previously described, detects the focus error signal and the tracking error signal based on the output signal of the optical pickup unit 23, and corrects focus error and tracking error through the servo controller 33 and the motor driver 27 whenever necessary.

When the reproduced data stored in the buffer RAM 34 becomes complete as sector data, the buffer manager 37 transfers the reproduced data through the interface 38 to the host 50.

As is apparent from the above description, in the information recording system according to the second embodiment, the microcomputer of the main control unit 52 and the program executed by the microcomputer realize the acquisition part, the determination part, the addition part, and the session number acquiring part of the information processing apparatus.

Needless to say, however, the present invention is not limited to this configuration. The above-described embodiment only shows one configuration, and at least part of the configuration realized by the operation according to the program executed by the microcomputer of the main control unit 52 may be formed by hardware. Alternatively, the entire configuration may be formed by hardware.

Further, according to the second embodiment, of the programs installed in the HDD 56, the program corresponding to the operation shown in the flowchart of FIG. 15 forms the user data recording program.

Furthermore, according to the second embodiment, steps S513 through S521 of FIG. 15 form the first process, step S523 of FIG. 15 forms the second process, and steps S505 through S511 of FIG. 15 form the third process of a recording method according to the present invention.

As described above, according to the information recording system of the second embodiment, the main control unit 52, receiving a request to record user data from a user, acquires the region information from the optical disk unit 20 and obtains the specific address information and the unrecorded sector number information. Then, the main control unit 52 obtains the relationship between the position of the specific address and the position of the end address of the region in which the user data is recorded in the recording region of the optical disk 15. When the value of the end address is smaller than or equal to the value of the specific address, dummy data is recorded successively after the user data so that the value of the end address exceeds the value of the specific address. That is, the end address is always positioned on the outer (peripheral) side of the position of the specific address on the optical disk 15. Accordingly, if the conditions for ensuring compatibility with (a device for) an information recording medium of another type include a condition relating to the amount of data recorded, for instance, it is possible to prevent the compatibility from being lost even if the amount of data is insufficient. That is, it is possible to ensure compatibility with (a device for) an information recording medium of another type.

Further, according to the second embodiment, only when the session number of the session in which the user data is recorded is "1," the operation relating to the addition of dummy data is performed. Thereby, it is possible to ensure compatibility with (a device for) an information recording medium of a type whose amount of data in the first (initial) session is specified.

Furthermore, according to the second embodiment, the READ TRACK INFORMATION command is employed as a command to acquire the region information. This makes it possible to acquire track information together with the region information.

In addition, the information processing apparatus according to the second embodiment, receiving a request to record user data from a user, instructs the optical disk unit 20 to record the user data. After the recording of the user data, the information processing apparatus acquires the region information from the optical disk unit 20 and determines whether the amount of the user data is large enough to ensure compatibility with a DVD-ROM drive. If it is determined that the amount of the user data is not enough, predetermined dummy data is recorded successively after the user data so that the amount of data reaches a value required to ensure compatibility with a DVD-ROM drive. Thereby, the compatibility with (a device for) an information recording medium of another type can be ensured.

In the second embodiment, it is determined in step S521 whether the value of the end address is smaller than or equal to the value of the specific address. The present invention, however, is not limited to this configuration. It may be determined in step S521 whether the value of the end address is smaller than the value of the specific address. Needless to say, in this case, the operation of step S523 is changed. That is, in step S523, dummy data required to make the value of the end address larger than or equal to the value of the specific address is set. The condition for this determination relates to the characteristics of the DVD-ROM drive used for data reproduction.

Third Embodiment

Next, a description will be given, with reference to FIG. 16, of a third embodiment of the present invention.

The third embodiment is characterized in that the user data recording program is different from that of the above-described second embodiment. That is, the third embodiment is different from the second embodiment only in the user data recording program stored in the HDD 56, and is equal to the second embodiment in the other configuration of the information recording system. Accordingly, the following description will be given focusing on the difference from the second embodiment. The same elements as or the elements equivalent to those of the second embodiment are referred to by the same numerals, and a description thereof will be simplified or omitted.

A description will be given, with reference to the flowchart of FIG. 16, of the operation of the main control unit 52 when the main control unit 52 receives a request to record user data from a user via the input device 57. When the recording request is input to the main control unit 52, the starting address of the program corresponding to the flowchart of FIG. 16 is set in the program counter of the microcomputer of the main control unit 52, so that the algorithm corresponding to the flowchart of FIG. 16 starts. The flowchart of FIG. 16 corresponds to a series of operation algorithms executed by the microcomputer of the main control unit 52. The prerequisites for the optical disk 15 are the same as those in the second embodiment.

First, in steps S601 through S605 of FIG. 16, the same operations as those in steps S505 through S509 of the second embodiment are performed.

Next, in step S607, it is determined whether the session number of the session in which the user data is recorded is "1." If the session number is "1" (that is, "YES" in step S607), the operation proceeds to step S611.

In steps S611 through S615, the same operations as those in steps S513 through S517 of the second embodiment are performed.

In step S617, using at least one of the specific address information and the unrecorded sector number information, a minimum amount of data to be recorded NB necessary for ensuring compatibility with a DVD-ROM drive is calculated. In the case of using the specific address information, for instance, a minimum number of sectors to be recorded is obtained from the recording starting address and the specific address information, and the minimum number of sectors to be recorded is converted to a recording capacity so that the minimum amount of data to be recorded NB is obtained. In the case of using the unrecorded sector number information, the amount of data to be recorded NB is obtained by converting the number of unrecorded sectors to a recording capacity.

Next, in step S619, the amount of the user data and the minimum amount of data to be recorded NB are compared, and it is determined whether the amount of the user data is smaller than the minimum amount of data to be recorded NB. If the amount of the user data is smaller than the minimum amount of data to be recorded NB (that is, "YES" in step S619), the operation proceeds to step S621.

In step S621, dummy data is added to the user data so that the amount of the user data is larger than or equal to the minimum amount of data to be recorded NB, thereby creating new user data.

Next, in step S623, a WRITE command is transmitted to the optical disk unit 20 in order to record the user data. When the transmission of all the user data is completed, the operation at the time of receiving a recording request ends. The optical disk unit 20 records the user data on the optical disk 15 as previously described.

If the amount of the user data is larger than or equal to the minimum amount of data to be recorded NB in step S619 (that is, "NO" in step S619) the operation proceeds to step S623. That is, the user data is transmitted to the optical disk unit 20 with no dummy data being added to the user data.

If the session number of the session in which the user data is recorded is not "1" in step S607 (that is, "NO" in step S607), the operation proceeds to step S623. In this case, the user data is also transmitted to the optical disk unit 20 with no dummy data being added to the user data.

As is apparent from the above description, in the information recording system according to the third embodiment, the microcomputer of the main control unit 52 and the program executed by the microcomputer realize the acquisition part, the determination part, the addition part, and the session number acquiring part of the information processing apparatus.

Needless to say, however, the present invention is not limited to this configuration. The above-described embodiment only shows one configuration, and at least part of the configuration realized by the operation according to the program executed by the microcomputer of the main control unit 52 may be formed by hardware. Alternatively, the entire configuration may be formed by hardware.

Further, according to the third embodiment, of the programs installed in the HDD 56, the program corresponding to the operation shown in the flowchart of FIG. 16 forms the user data recording program.

Furthermore, according to the third embodiment, steps S611 through S619 of FIG. 16 form the first process, step S621 of FIG. 16 forms the second process, and steps S601 through S607 of FIG. 16 form the third process of a recording method according to the present invention.

As described above, according to the information recording system of the third embodiment, the main control unit 52, receiving a request to record user data from a user, acquires the region information from the optical disk unit 20 and obtains the specific address information and the unrecorded sector number information. Then, the main control unit 52 obtains the minimum amount of data to be recorded NB in order to make the value of the end address of the region in which the user data is recorded in the recording region of the optical disk 15 larger than or equal to the value of the specific address. If the amount of the user data is smaller than the minimum amount of data to be recorded NB, dummy data is added to the user data to increase that amount of the user data so that the value of the end address is larger than or equal to the value of the specific address, thereby creating new user data. That is, the end address is always prevented from being positioned on the inner (center) side of the position of the specific address on the optical disk 15. Accordingly, if the conditions for ensuring compatibility with (a device for) an information recording medium of another type include a condition relating to the amount of data recorded, for instance, it is possible to prevent the compatibility from being lost even if the amount of user data is insufficient. That is, it is possible to ensure compatibility with (a device for) an information recording medium of another type.

Further, the information processing apparatus according to the third embodiment acquires the region information from the optical disk unit 20 and determines whether the amount of the user data is large enough to ensure compatibility with a DVD-ROM drive. If it is determined that the amount of the user data is not enough, predetermined dummy data is added to the user data so that the amount of data reaches a value required to ensure compatibility with a DVD-ROM drive. Thereby, the compatibility with (a device for) an information recording medium of another type can be ensured.

In the third embodiment, it is determined in step S619 whether the amount of the user data is smaller than the minimum amount of data to be recorded NB. The present invention, however, is not limited to this configuration. It may be determined in step S619 whether the amount of the user data is smaller than or equal to the minimum amount of data to be recorded NB. Needless to say, in this case, the operation of step S621 is changed. That is, in step S621, dummy data is added to the user data so that the amount of the user data exceeds the minimum amount of data to be recorded NB. The condition for this determination relates to the characteristics of a DVD-ROM drive used for data reproduction.

In the above-described second and third embodiments, the description is given of the case where the optical disk unit 20 transmits the track information block in which the specific address information and the unrecorded sector number information are set as the region information. However, the optical disk unit 20 may transmit a track information block in which one of the specific address information and the unrecorded sector number information is set as the region information. Further, the host 50 may specify necessary information as the region information.

Further, in the above-described second and third embodiments, the description is given of the case where the specific address information and the unrecorded sector number information are employed as the region information. The region information, however, may include information on a recording capacity on the inner side of the specific address and information on the capacity of an unrecorded region on the inner side of the specific address.

Furthermore, in the above-described second and third embodiments, the description is given of the case where the adding of dummy data is performed only when the session number of the session in which the user data is recorded is "1." However, the adding of dummy data may be performed in the case where the session number is other than "1." That is, the operation of checking the session number (steps S505 through S511 in FIG. 15 and steps S601 through S607 in FIG. 16) may be omitted. This is because reproduction operations differ depending on the DVD-ROM employed for data reproduction.

Further, in the above-described second and third embodiments, the description is given of the case where the READ TRACK INFORMATION command is employed as a command to request the region information. However, another command or a newly defined command may be employed instead of the READ TRACK INFORMATION command. In this case, response information including the region information also corresponds to the employed command.

Furthermore, in the above-described second and third embodiments, the description is given of the case where the address information of a sector located 30 mm from the rotational center of the optical disk 15 is employed as a predetermined position. The present invention, however, is not limited to this configuration.

In addition, in the above-described second and third embodiments, the description is given of the case of ensuring compatibility with a DVD-ROM drive. However, the present invention is not limited to this configuration.

Moreover, in the above-described second and third embodiments, the description is given of the case where it is determined on the host 50 side whether the adding of dummy data is required. However, the necessity of the adding of dummy data may be determined on the optical disk unit 20 side. In this case, based on, for instance, the amount of the user data received from the host 50 in accordance with a program recorded in the ROM 39, the CPU 40 of the optical disk unit 20 predicts the end address of the user data when the user data is recorded and determines the necessity of the adding of dummy data by comparing the end address and the specific address. That is, the CPU 40 and the program executed by the CPU 40 realize the acquisition part, the determination part, the addition part, and the session number acquiring part of the information recording apparatus.

Further, in the above-described second and third embodiments, the description is given of the case where the optical disk 15 is a DVD+R. The present invention, however, is not limited to this configuration. In the case of employing a recording medium of a different type, an optical disk unit supporting the employed recording medium is used.

Further, in the above-described second and third embodiments, the user data recording program is recorded in the HDD 56. The user data recording program, however, may be recorded in a different recording medium such as a CD-ROM, a magneto-optical disk, a flash memory, or a flexible disk. In this case, a drive unit supporting the recording medium recording the user data recording program is added so that the user data recording program is installed from the disk unit. That is, it is necessary for the user data recording program to be loaded into the main memory of the microcomputer.

Further, in the above-described second and third embodiments, the host 50 and the optical disk unit 20 may be provided in the same housing or separately in individual housings.

Further, in the above-described second and third embodiments, the description is given of the case of employing the optical disk unit that can record user data on and reproduce user data from an information recording medium based on the DVD+R standard. The present invention is not limited to this configuration, but may employ an optical disk unit that only records user data.

The present invention is not limited to the specifically disclosed embodiments, but variations and modifications may be made without departing from the scope of the present invention.

The present application is based on Japanese priority applications No. 2002-125337 filed on Apr. 26, 2002 and No. 2002-128720 filed on Apr. 30, 2002, the entire contents of which are hereby incorporated by reference.

What is claimed is:

1. A method of optically recording data on a disk-like information recording medium from a center side to a peripheral side thereof, the method comprising:
dividing the information recording medium into a plurality of recording divisions;
recording the data in an initial one of the recording divisions of the disk-like information recording medium;
recording terminal end information successively, the terminal end information indicating an end of the initial one of the recording divisions;
determining whether the terminal end information recorded on the information recording medium reaches a predetermined physical distance from the center side of the information recording medium; and
if the terminal end information does not reach the predetermined physical distance, extending and recording the terminal end information so that the terminal end information reaches the predetermined physical distance.

2. The method as claimed in claim 1, wherein: the information recording medium is based on a DVD+R standard; and information recording based on the DVD+R standard is performed on the information recording medium.

3. The method as claimed in claim 2, wherein said extending and recording extends and records a buffer zone of a closure serving as the terminal end information.

4. The method as claimed in claim 2, wherein said extending and recording extends and records an outer session identification zone of a closure serving as the terminal end information.

5. The method as claimed in claim 2, wherein said extending and recording additionally records a buffer zone after an outer session identification zone of a closure serving as the terminal end information.

6. The method as claimed in claim 2, further comprising:
recording information on a position of the terminal end information in an unused region on the information recording medium.

7. The method as claimed in claim 6, wherein said recording information on a position of the terminal end information includes recording the information on the position of the terminal end information in the unused region in a lead-in.

8. The method as claimed in claim 6, wherein said recording information on a position of the terminal end information includes recording the information on the position of the terminal end information in the unused region in a closure serving as the terminal end information.

9. The method as claimed in claim 6, wherein said recording information on a position of the terminal end information includes recording the information on the position of the terminal end information in the unused region in an intro.

10. The method as claimed in claim 6, wherein said recording information on a position of the terminal end information includes recording the information on the position of the terminal end information in the unused region in a table of contents zone.

11. The method as claimed in claim 1, further comprising:
recording information on a position of the terminal end information in an unused region on the information recording medium.

12. An apparatus for optically recording data on a disk-like information recording medium from a center side to a peripheral side thereof, the apparatus comprising:
a dividing part dividing the information recording medium into a plurality of recording divisions;
a first part recording the data in an initial one of the recording divisions;
a second part recording terminal end information successively after recording the data, the terminal end information indicating an end of the initial one of the recording divisions;
a third part determining whether the terminal end information recorded on the information recording medium reaches a predetermined physical distance from the center side of the information recording medium; and
a fourth part that, in recording the terminal end information, if said third part determines that the terminal end information does not reach the predetermined physical distance, extends the terminal end information so that the terminal end information reaches the predetermined physical distance.

13. The apparatus as claimed in claim 12, wherein:
the information recording medium is based on a DVD+R standard; and
information recording based on the DVD+R standard is performed on the information recording medium.

14. The apparatus as claimed in claim 13, wherein said fourth part extends and records a buffer zone of a closure serving as the terminal end information in extending and recording the terminal end information.

15. The apparatus as claimed in claim 13, wherein said fourth part extends and records an outer session identification zone of a closure serving as the terminal end information in extending and recording the terminal end information.

16. The apparatus as claimed in claim 13, wherein said fourth part additionally records a buffer zone after an outer session identification zone of a closure serving as the terminal end information in extending and recording the terminal end information.

17. The apparatus as claimed in claim 13, further comprising a fifth part recording information on a position of the terminal end information in an unused region on the information recording medium.

18. The apparatus as claimed in claim 17, wherein said fifth part records the information on the position of the terminal end information in the unused region in a lead-in.

19. The apparatus as claimed in claim 17, wherein said fifth part records the information on the position of the terminal end information in the unused region in a closure serving as the terminal end information.

20. The apparatus as claimed in claim 17, wherein said fifth part records the information on the position of the terminal end information in the unused region in an intro.

21. The apparatus as claimed in claim 17, wherein said fifth part records the information on the position of the terminal end information in the unused region in a table of contents zone.

22. The apparatus as claimed in claim 12, further comprising a fifth part recording information on a position of the terminal end information in an unused region on the information recording medium.

23. An information processing apparatus controlling an information recording apparatus for optically recording data on a disk-like information recording medium from a center side to a peripheral side thereof, the information processing apparatus comprising:
a dividing part causing the information recording apparatus to divide the information recording medium into a plurality of recording divisions;
a first part causing the information recording apparatus to record the data in an initial one of the recording divisions;
a second part causing the information recording apparatus to record terminal end information successively after recording the data, the terminal end information indicating an end of the initial one of the recording divisions;
a third part determining whether the terminal end information recorded on the information recording medium reaches a predetermined physical distance from the center side of the information recording medium; and
a fourth part that, if said third part determines that the terminal end information does not reach the predetermined physical distance, causes the information recording apparatus to extend and record the terminal end information so that the terminal end information reaches the predetermined physical distance.

24. An information processing apparatus controlling an information recording apparatus for optically recording data on a disk-like information recording medium from a center side to a peripheral side thereof, the information processing apparatus comprising:
a dividing part causing the information recording apparatus to divide the information recording medium into a plurality of recording divisions;
a first part causing the information recording apparatus to record the data in an initial one of the recording divisions;

a second part causing the information recording apparatus to record terminal end information successively after recording the data, the terminal end information indicating an end of the initial one of the recording divisions;

a third part causing the information recording apparatus to determine whether the terminal end information recorded on the information recording medium reaches a predetermined physical distance from the center side of the information recording medium; and a fourth part that, if the information recording apparatus determines that the terminal end information does not reach the predetermined physical distance, causes the information recording apparatus to extend and record the terminal end information so that the terminal end information reaches the predetermined physical distance.

25. An information recording system comprising:

an information recording part optically recording data on a disk-like information recording medium from a center side to a peripheral side thereof, dividing the information recording medium into a plurality of recording divisions;

an information processing part issuing an information recording command to said information recording part; and a part causing a function of recording data in an initial one of the recording divisions in said information recording part, a function of recording terminal end information successively after recording the data in said information recording part, the terminal end information indicating an end of the initial one of the recording divisions, a function of determining whether the terminal end information recorded on the information recording medium reaches a predetermined physical distance from the center side of the information recording medium, and, if it is determined that the terminal end information does not reach the predetermined physical distance to be centralized on and executed by one of said information recording part and said information processing part or to be distributed between and executed by said information recording part and said information processing part, a function of extending and recording the terminal end information in said information recording part so that the terminal end information reaches the predetermined physical distance.

26. A non-transitory computer-readable recording medium storing a machine-readable computer program for causing a computer to execute a method of optically recording data on a disk-like information recording medium from a center side to a peripheral side thereof, the method comprising the steps of:

dividing the information recording medium into a plurality of recording divisions;

recording the data in an initial one of the recording divisions;

recording terminal end information successively after said recording the data in an initial one of the recording divisions, the terminal end information indicating an end of the initial one of the recording divisions;

determining whether the terminal end information recorded on the information recording medium reaches a predetermined physical distance from the center side of the information recording medium; and extending and recording the terminal end information so that the terminal end information reaches the predetermined physical distance.

27. A non-transitory computer-readable recording medium storing a machine-readable computer program to be installed in a computer provided to an information processing apparatus controlling an information recording apparatus for optically recording data on a disk-like information recording medium from a center side to a peripheral side thereof, the machine-readable computer program causing the computer to execute an information recording method, the information recording method comprising:

dividing the information recording medium into a plurality of recording divisions;

causing the information recording apparatus to record the data in an initial one of the recording divisions;

causing the information recording apparatus to record terminal end information, the terminal end information indicating an end of the initial one of the recording divisions;

determining whether the terminal end information recorded on the information recording medium reaches a predetermined physical distance from the center side of the information recording medium; and if it is determined that the terminal end information does not reach the predetermined physical distance, causing the information recording apparatus to extend and record the terminal end information so that the terminal end information reaches the predetermined physical distance.

28. A non-transitory computer-readable recording medium storing a machine-readable computer program to be installed in a computer provided to an information processing apparatus controlling an information recording apparatus for optically recording data on a disk-like information recording medium from a center side to a peripheral side thereof, dividing the information recording medium into a plurality of recording divisions, the machine-readable computer program causing the computer to execute an information recording method, the information recording method comprising:

causing the information recording apparatus to record the data in an initial one of the recording divisions;

causing the information recording apparatus to record terminal end information, the terminal end information indicating an end of the initial one of the recording divisions;

causing the information recording apparatus to determine whether the terminal end information recorded on the information recording medium reaches a predetermined physical distance from the center side of the information recording medium; and if it is determined that the terminal end information does not reach the predetermined physical distance, causing the information recording apparatus to extend and record the terminal end information so that the terminal end information reaches the predetermined physical distance.

29. A non-transitory computer-readable recording medium storing a machine-readable computer program to be installed in one of a computer provided to an information recording apparatus for optically recording data on a disk-like information recording medium from a center side to a peripheral side thereof, and a computer provided to an information processing apparatus issuing an information recording command to the information recording apparatus, the machine-readable computer program causing the one of the computers to execute an information recording method, the information recording method comprising:

dividing the information recording medium into a plurality of recording divisions;

recording data in an initial one of the recording divisions in the information recording apparatus;

recording terminal end information successively after recording the data in the information recording apparatus, the terminal end information indicating an end of the initial one of the recording divisions;

determining whether the terminal end information recorded on the information recording medium reaches a predetermined physical distance from the center side of the information recording medium; and if it is determined that the terminal end information does not reach the predetermined physical distance, extending and recording the terminal end information in the information recording apparatus so that the terminal end information reaches the predetermined physical distance.

30. A non-transitory computer-readable recording medium storing a machine-readable computer program to be installed in a computer provided to an information recording apparatus for optically recording data on a disk-like information recording medium from a center side to a peripheral side thereof, and a computer provided to an information processing apparatus issuing an information recording command to the information recording apparatus, the machine-readable computer program causing the computers to execute an information recording method, the information recording method comprising:

dividing the information recording medium into a plurality of recording divisions;

recording data in an initial one of the recording divisions in the information recording apparatus;

recording terminal end information successively after recording the data in the information recording apparatus, the terminal end information indicating an end of the initial one of the recording divisions;

determining whether the terminal end information recorded on the information recording medium reaches a predetermined physical distance from the center side of the information recording medium; and if it is determined that the terminal end information does not reach the predetermined physical distance, extending and recording the terminal end information in the information recording apparatus so that the terminal end information reaches the predetermined physical distance wherein said recording data in an initial one of the recording divisions, said recording terminal end information, said determining, and said extending and recording are executed partly by the computer provided to the information recording apparatus and partly by the computer provided to the information processing apparatus.

31. The method as claimed in claim 1, wherein the recording the data in an initial one of the recording divisions and the recording terminal end information is performed by using an apparatus that emits a laser beam onto the recording surface of the disk-like information recording medium.

32. The method as claimed in claim 1, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

33. The method as claimed in claim 12, wherein
the terminal end information comprises a buffer zone and an outer session identification zone, and
extending the terminal end information comprises extending the recorded length of one of the buffer zone, the outer session zone, and a dummy zone, the dummy zone being added after the outer session zone.

34. The method as claimed in claim 23, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

35. The method as claimed in claim 24, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

36. The method as claimed in claim 25, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

37. The method as claimed in claim 26, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

38. The method as claimed in claim 27, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

39. The method as claimed in claim 28, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

40. The method as claimed in claim 29, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

41. The method as claimed in claim 30, wherein
the terminal end information comprises a buffer zone and an outer session identification zone, and
extending and recording the terminal end information comprises extending the recorded length of one of the buffer zone, the outer session zone, and a dummy zone, the dummy zone being added after the outer session zone.

42. The method as claimed in claim 1, wherein said determining includes calculating the amount of data recorded and checking a table identifying a relationship between data sector numbers and radial positions from the center side of the information recording medium.

43. The method as claimed in claim 12, wherein said determining includes calculating the amount of data recorded and checking a table identifying a relationship between data sector numbers and radial positions from the center side of the information recording medium.

44. The method as claimed in claim 23, wherein said determining includes calculating the amount of data recorded and checking a table identifying a relationship between data sector numbers and radial positions from the center side of the information recording medium.

45. The method as claimed in claim 24, wherein said determining includes calculating the amount of data recorded and checking a table identifying a relationship between data sector numbers and radial positions from the center side of the information recording medium.

46. The method as claimed in claim 25, wherein said determining includes calculating the amount of data recorded and checking a table identifying a relationship between data sector numbers and radial positions from the center side of the information recording medium.

47. The method as claimed in claim 26, wherein said determining includes calculating the amount of data recorded and checking a table identifying a relationship between data sector numbers and radial positions from the center side of the information recording medium.

48. The method as claimed in claim 27, wherein said determining includes calculating the amount of data recorded and checking a table identifying a relationship between data sector numbers and radial positions from the center side of the information recording medium.

49. The method as claimed in claim 28, wherein said determining includes calculating the amount of data recorded and checking a table identifying a relationship between data sector numbers and radial positions from the center side of the information recording medium.

50. The method as claimed in claim 29, wherein said determining includes calculating the amount of data recorded and checking a table identifying a relationship between data sector numbers and radial positions from the center side of the information recording medium.

51. The method as claimed in claim 30, wherein said determining includes calculating the amount of data recorded and checking a table identifying a relationship between data sector numbers and radial positions from the center side of the information recording medium.

52. The method as claimed in claim 1, further comprising recording information on a position of the terminal end information in an unused region on the information recording medium so that a starting position of a next session can be indicated.

53. The method as claimed in claim 1, further comprising when a read disk information command is received by an optical disk unit, setting disk information including a session number in a predetermined position on a disk information block; and transmitting the disk information block to a host.

54. The method as claimed in claim 53, further comprising:
extracting the disk information from the disk information block to obtain the session number in which user data is to be recorded.

55. The method as claimed in claim 53, further comprising:
if the session number is a predetermined number indicating a first session, requesting region information for maintaining compatibility with a disk format that is the format of the disk-like information recording medium.

* * * * *